US010676971B2

United States Patent
Do

(10) Patent No.: US 10,676,971 B2
(45) Date of Patent: Jun. 9, 2020

(54) ROTARY LATCH SYSTEM

(71) Applicant: Arconic Inc., Pittsburgh, PA (US)

(72) Inventor: Thai Do, Laguna Niguel, CA (US)

(73) Assignee: Arconic Inc., Pittsburgh, PA (US)

( * ) Notice: Subject to any disclaimer, the term of this patent is extended or adjusted under 35 U.S.C. 154(b) by 522 days.

(21) Appl. No.: 15/620,283

(22) Filed: Jun. 12, 2017

(65) Prior Publication Data

US 2017/0356223 A1    Dec. 14, 2017

Related U.S. Application Data

(60) Provisional application No. 62/349,174, filed on Jun. 13, 2016.

(51) Int. Cl.
  *E05C 3/12*    (2006.01)
  *E05B 35/00*   (2006.01)
  (Continued)

(52) U.S. Cl.
  CPC ............. *E05C 3/12* (2013.01); *B64D 29/06* (2013.01); *E05B 15/0086* (2013.01);
  (Continued)

(58) Field of Classification Search
  CPC ..... E05C 3/12; E05C 3/10; E05C 3/00; E05C 3/006; E05C 3/008; E05C 3/02;
  (Continued)

(56) References Cited

U.S. PATENT DOCUMENTS 1,206,342 A   11/1916   Linborg
2,712,955 A   7/1955    Andrews
(Continued)

FOREIGN PATENT DOCUMENTS

CN    203113954 U    8/2013
CN    206829859 U    1/2018
(Continued)

OTHER PUBLICATIONS

Notification of Transmittal of the International Search Report and Written Opinion of the International Searching Authority dated Aug. 30, 2017, issued in International Application No. PCT/US2017/037016 (13 pages).
(Continued)

*Primary Examiner* — Alyson M Merlino
(74) *Attorney, Agent, or Firm* — Greenberg Traurig, LLP

(57) ABSTRACT

A latch includes a base having a bore extending therethrough defining an axis, a plunger positioned within the bore and rotatable about the axis, a drive shaft positioned adjacent the base and engaged with the plunger such that rotation of the plunger about the axis causes corresponding rotation of the drive shaft about the axis, a bracket positioned adjacent the base and the drive shaft and engaged with the drive shaft such that rotation of the drive shaft about the axis causes movement of the bracket, and a closure element coupled to the bracket such that movement of the bracket causes the closure element to move between a position wherein the closure element allows a structure to move with respect to an adjacent structure and a position in which the closure element prevents the structure from moving with respect to the adjacent structure.

18 Claims, 13 Drawing Sheets

(51) Int. Cl.
*E05B 17/20* (2006.01)
*E05B 15/00* (2006.01)
*B64D 29/06* (2006.01)
*E05B 41/00* (2006.01)
*E05C 3/10* (2006.01)
*E05B 63/00* (2006.01)

(52) U.S. Cl.
CPC ........ *E05B 17/2007* (2013.01); *E05B 35/008* (2013.01); *E05B 41/00* (2013.01); *E05C 3/10* (2013.01); *E05B 63/006* (2013.01)

(58) Field of Classification Search
CPC ... E05C 3/06; E05C 3/16; E05C 3/165; E05C 19/14; E05C 19/145; E05C 19/12; Y10T 292/1043; Y10T 292/1075; Y10T 292/1076; Y10T 292/1077; Y10T 292/108; Y10T 292/1094; Y10T 292/1097; Y10T 292/1098; Y10T 292/20; Y10T 292/202; Y10T 292/225; Y10T 70/5416; Y10T 70/5827; Y10T 70/7576; Y10T 70/5217; Y10T 70/5345; Y10T 70/5354; Y10T 70/5363; Y10T 292/0886; Y10T 292/0887; Y10T 292/0889; Y10T 292/089; Y10T 292/0892; E05B 15/0086; E05B 17/2007; E05B 35/008; E05B 41/00; E05B 63/006; B64D 29/06; Y10S 292/11; Y10S 292/49; Y10S 292/60

See application file for complete search history.

(56) References Cited

U.S. PATENT DOCUMENTS

| | | |
|---|---|---|
| 2,726,889 A | 12/1955 | Lawson |
| 2,904,141 A | 9/1959 | Henrichs |
| 2,927,812 A | 3/1960 | Smith et al. |
| 2,944,848 A | 7/1960 | Mandolf |
| 3,070,395 A | 12/1962 | Morrison et al. |
| 3,259,411 A | 7/1966 | Griffiths |
| 3,259,412 A | 7/1966 | Wheeler |
| 3,341,239 A | 9/1967 | Wheeler |
| 3,347,578 A | 10/1967 | Sheehan et al. |
| 3,473,693 A | 10/1969 | Fritz |
| 3,917,327 A | 11/1975 | Plasko |
| 4,053,177 A | 10/1977 | Stammreich et al. |
| 4,099,751 A | 7/1978 | Poe et al. |
| 4,116,479 A | 9/1978 | Poe |
| 4,130,307 A | 12/1978 | Poe et al. |
| 4,183,564 A | 1/1980 | Poe |
| 4,220,364 A | 9/1980 | Poe |
| 4,413,849 A * | 11/1983 | Davis ............... E05C 3/048 292/229 |
| RE31,935 E | 7/1985 | Poe |
| 4,530,529 A | 7/1985 | Poe et al. |
| 4,538,843 A | 9/1985 | Harris |
| 4,602,812 A | 7/1986 | Bourne |
| 4,641,868 A | 2/1987 | Miron |
| 4,826,221 A | 5/1989 | Harmon |
| 4,828,299 A | 5/1989 | Poe |
| 4,858,970 A | 8/1989 | Tedesco et al. |
| 4,911,488 A | 3/1990 | Brackmann et al. |
| 5,152,926 A | 10/1992 | Brown |
| 5,228,730 A | 7/1993 | Gokcebay et al. |
| 5,341,752 A | 8/1994 | Hambleton |
| 5,609,373 A | 3/1997 | Gromotka |
| 5,620,212 A | 4/1997 | Bourne et al. |
| 5,660,295 A | 8/1997 | Hroma et al. |
| 5,664,813 A | 9/1997 | Gromotka |
| 5,984,382 A | 11/1999 | Bourne et al. |
| 5,992,908 A * | 11/1999 | Yared ............... E05C 3/06 292/196 |
| 6,123,370 A | 9/2000 | Rozema et al. |
| 6,343,815 B1 | 2/2002 | Poe |
| 6,361,090 B1 | 3/2002 | Fan |
| 6,755,448 B2 | 6/2004 | Jackson et al. |
| 6,913,297 B2 | 7/2005 | Jackson et al. |
| 7,029,038 B2 | 4/2006 | Kobrehel |
| 7,156,429 B2 | 1/2007 | Eriksson |
| 7,504,601 B2 | 3/2009 | Belmond et al. |
| 7,857,362 B2 | 12/2010 | Deblock |
| 8,479,543 B2 | 7/2013 | Yang et al. |
| 8,646,819 B2 | 2/2014 | Do et al. |
| 8,727,390 B2 | 5/2014 | Do |
| 8,864,185 B2 | 10/2014 | Do |
| 9,353,559 B2 | 5/2016 | Fabre et al. |
| 9,650,807 B2 * | 5/2017 | Helsley ............ E05B 35/008 |
| 2002/0000726 A1 | 1/2002 | Zintler |
| 2002/0060459 A1 | 5/2002 | Zintler |
| 2005/0087996 A1 | 4/2005 | Jackson et al. |
| 2006/0214431 A1 | 9/2006 | Helsley et al. |
| 2008/0129056 A1 | 6/2008 | Hernandez et al. |
| 2009/0151409 A1 * | 6/2009 | Baic ............... E05C 3/06 70/157 |
| 2011/0109103 A1 | 5/2011 | Huston et al. |
| 2012/0102842 A1 | 5/2012 | Fournie et al. |
| 2012/0151724 A1 | 6/2012 | DeFrance et al. |
| 2013/0106122 A1 | 5/2013 | Do et al. |
| 2015/0184543 A1 | 7/2015 | Fabre et al. |
| 2015/0184544 A1 | 7/2015 | Fabre et al. |

FOREIGN PATENT DOCUMENTS

| | | |
|---|---|---|
| DE | 202220 C | 9/1908 |
| DE | 29807738 U1 | 7/1998 |
| EP | 1091059 A2 | 4/2001 |
| EP | 2031157 A1 | 3/2009 |
| EP | 2444575 A1 | 4/2012 |
| EP | 2551199 A1 | 1/2013 |
| EP | 2674362 A1 | 12/2013 |
| FR | 2397503 A1 | 2/1979 |
| FR | 2852049 A1 | 9/2004 |
| GB | 191493 A | 1/1923 |
| GB | 332650 A | 7/1930 |
| GB | 683445 | 11/1952 |
| GB | 1497982 A | 1/1978 |
| GB | 1537410 A | 12/1978 |
| GB | 2162573 A | 2/1986 |
| WO | 0048870 A1 | 8/2000 |
| WO | 2010033026 A1 | 3/2010 |
| WO | 2010149905 A1 | 12/2010 |
| WO | 2011069103 A1 | 6/2011 |
| WO | 2012096986 A1 | 7/2012 |

OTHER PUBLICATIONS

International Search Report and Written Opinion dated Jul. 20, 2012, issued by the European Patent Office in connection with International Patent Application No. PCT/US2012/028418 entitled "Pin Latch Having Intermediate Position" (13 pages).

International Search Report and Written Opinion dated Jan. 18, 2013, issued by the European Patent Office in connection with International Patent Application No. PCT/US2012/059206 entitled "Rotary-Handle Latch" (9 pages).

International Search Report and Written Opinion dated Feb. 25, 2013, issued by the European Patent Office in connection with International Patent Application No. PCT/US2012/066039 entitled "Pin Latch With Detection Device and Movable Catch-Pin and Intermediate Position With Automatic Return Mechanism" (15 pages).

International Search Report and Written Opinion dated Dec. 29, 2011, issued by the European Patent Office in connection with International Patent Application No. PCT/US2011/027871 entitled "Latch With Adjustable Handle" (17 pages).

International Search Report and Written Opinion dated Jul. 15, 2011, issued by the European Patent Office in connection with International Patent Application No. PCT/US2011/027671 entitled "Latch With Adjustable Handle" (8 pages).

(56) References Cited

OTHER PUBLICATIONS

International Search Report and Written Opinion dated Jun. 7, 2011, issued by the European Patent Office in connection with International Patent Application No. PCT/US2011/024031 entitled "Side-Driven Action Pin Latch" (9 pages).
International Search Report and Written Opinion dated Jun. 9, 2016, issued by the European Patent Office in connection with International Patent Application No. PCT/US2016/024836 (13 pages).
Aerospace Latching Systems, Alcoa Fastening Systems, http://www.alcoa.com/fastening_systems/aerospace/en/product.asp?cat_id=213&prod_id=500,pp. I1-2, 159-60, and i-iii (8 pages).
Fairchild Fasteners, Aerospace Mechanisms, "RAM™ Aerospace Latch Mechanism", 2000 (4 pages).
Rotary Latch #TL18261, Alcoa Fastening Systems, Mar. 2005 (1 page).
English-language translation of WO 2010/149905 A1 (8 pages).
Alcoa Fastening Systems, Document TL22028 Rev. P, dated Jun. 18, 2015 (2 pages).

* cited by examiner

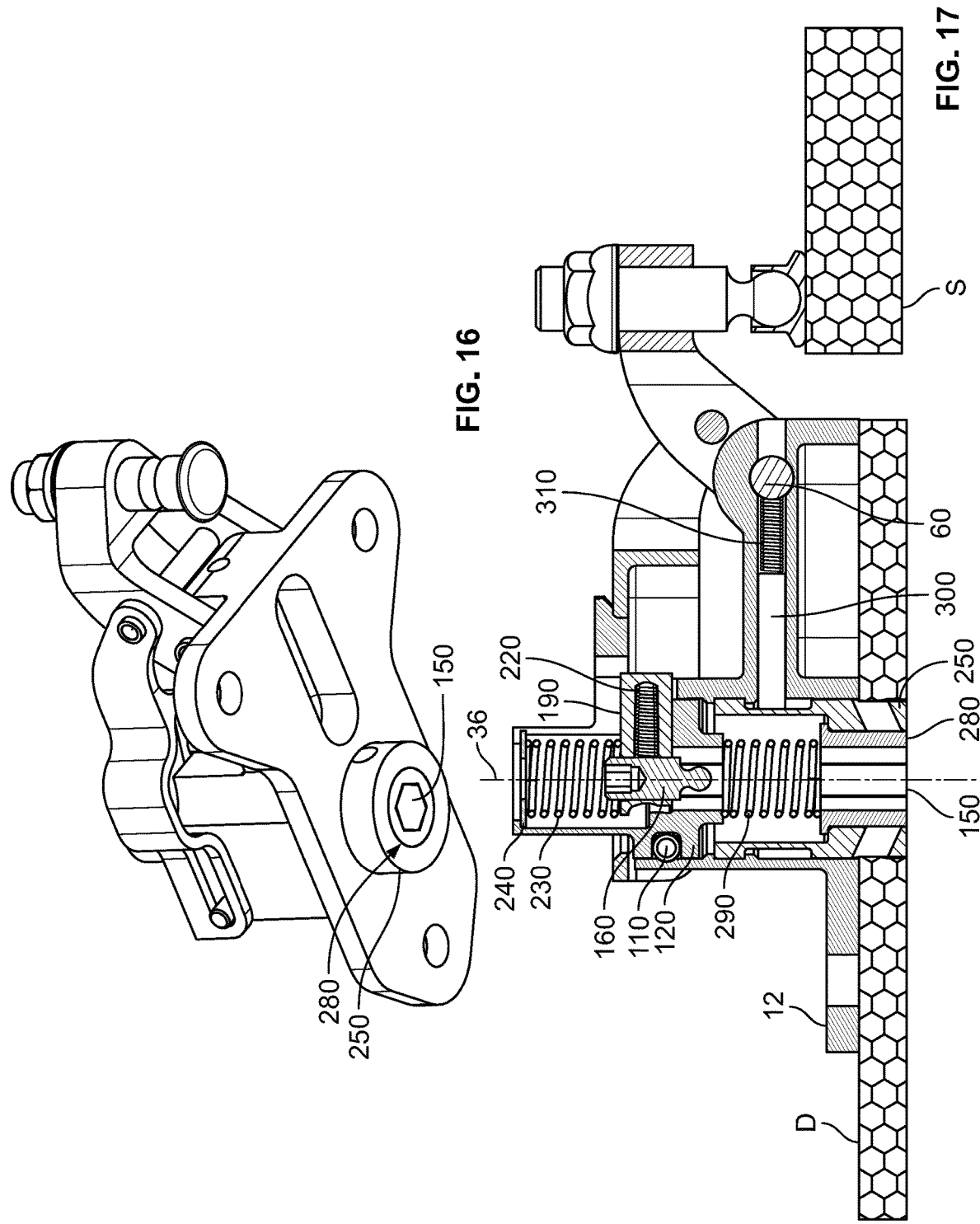

ROTARY LATCH SYSTEM

CROSS-REFERENCE TO RELATED APPLICATION

This application is a Section 111(a) application relating to and claiming the benefit of commonly-owned, U.S. Provisional Patent Application Ser. No. 62/349,174, filed Jun. 13, 2016, entitled "ROTARY LATCH SYSTEM," the contents of which are incorporated herein by reference in their entirety.

FIELD OF THE INVENTION

The present invention relates to latches and, more particularly, to rotary latch systems.

BACKGROUND OF THE INVENTION

Removable and moveable elements installed on exterior surfaces of aerospace vehicles, such as hatches, fan cowl doors and other doors, access panels, engine cowlings, nacelles, and radomes may employ latches. Latches may be positioned in an open position to allow such elements to be opened, or be positioned in a closed position to prevent such elements from being opened.

SUMMARY OF THE INVENTION

In an embodiment, a latch includes a base, an elongated plunger, a drive shaft, a bracket, and a closure element, the base including a planar portion and a projection, the planar portion having a first side and a second side opposite the first side, the planar portion being adapted to be secured to a first structure such that the first side of the planar portion abuts the structure, the projection protruding from the second side of the planar portion and having a first end at the second side of the planar portion and a second end opposite the first end, the base further including a bore extending from the first side of the planar portion to the second end of the projection, at least a portion of the bore being internally threaded, the bore defining a perpendicular axis that is perpendicular to the planar portion, the elongated plunger having a first end and a second end opposite the first end of the plunger, the plunger being movably positioned within the bore of the base so as to be oriented along the perpendicular axis and rotatable about the perpendicular axis between at least a first position and a second position, the drive shaft positioned adjacent the second end of the projection of the base and fixed to the base so as to be rotatable about the perpendicular axis but constrained from other motion, the drive shaft being coupled to the second end of the plunger such that rotation of the plunger between its first position and its second position causes the drive shaft to rotate about the perpendicular axis between a first position and a second position, the bracket positioned adjacent the second end of the projection of the base and fixed to the base so as to be linearly movable along an axis that is parallel to the planar portion of the base and perpendicular to the perpendicular axis, the bracket being coupled to the drive shaft such that rotation of the drive shaft between its first position and its second position causes motion of the bracket between a first position and a second position, the closure element coupled to the bracket such that motion of the bracket between its first position and its second position causes motion of the closure element between a first position and a second position, wherein, when the closure element is in its first position, the closure element abuts a second structure adjacent the first structure so as to prevent movement of the first structure with respect to the second structure, and wherein, when the closure element is in its second position, the closure element is positioned so as to allow movement of the first structure with respect to the second structure.

In an embodiment, the latch also includes an elongated dog leg having a first end, a second end opposite the first end of the elongated dog leg, a top surface, a bottom surface opposite the top surface, a bulb formed at the first end of the elongated dog leg, and a threaded bore extending through the bulb from the bottom surface to the top surface, the second end of the plunger is threaded, and the threaded bore of the dog leg is threadedly engaged with the second end of the plunger. In an embodiment, the drive shaft includes a substantially cylindrical portion having a first end, a second end, a bore extending from the first end of the cylindrical portion to the second end of the cylindrical portion, a projection extending from the cylindrical portion intermediate the first and second ends of the cylindrical portion, and a slot extending from the bore of the cylindrical portion along and at least partially through the projection, the slot being sized and shaped to receive the dog leg, the plunger is positioned within the bore of the drive shaft, the dog leg is positioned within the slot of the drive shaft, and rotation of the dog leg within the slot of the drive shaft and about the perpendicular axis causes corresponding rotation of the drive shaft about the perpendicular axis. In an embodiment, the base includes a first groove within the second end of the projection and a second groove within the second end of the projection, the first and second grooves being angularly offset from one another about the perpendicular axis such that when the plunger is in its first position, the dog leg is rotationally aligned with the first groove, and such that when the plunger is in its second position, the dog leg is rotationally aligned with the second groove.

In an embodiment, a position of the dog leg along the perpendicular axis is biased such that the dog leg engages one of the first and second grooves of the base when the dog leg is rotationally aligned with the one of the first and second grooves of the base, whereby when the dog leg engages one of the first and second grooves of the base, the dog leg is constrained from rotation about the perpendicular axis, and whereby the drive shaft is constrained from rotation about the perpendicular axis between its first position and its second position. In an embodiment, the latch also includes a compression spring, the drive shaft includes a flange extending at least partially across the bore at the second end of the drive shaft, and the compression spring is positioned between the dog leg and the flange of the drive shaft so as to bias the position of the dog leg along the perpendicular axis. In an embodiment, when the dog leg engages one of the first and second grooves of the base, the plunger is rotatable with respect to the dog leg about the perpendicular axis and the threaded engagement of the second end of the plunger with respect to the bore of the dog leg causes rotation of the plunger about the perpendicular axis to result in motion of the plunger along the perpendicular axis, whereby a position of the plunger along the perpendicular axis is adjustable.

In an embodiment, the drive shaft includes a substantially cylindrical portion having a first end, a second end, a bore extending from the first end of the cylindrical portion to the second end of the cylindrical portion, a projection extending from the cylindrical portion intermediate the first and second ends of the cylindrical portion, the bracket includes a bottom surface facing the base, a top surface opposite the bottom surface, a first side, a second side opposite the first side of the bracket, and a hole extending through the bracket from the bottom surface to the top surface, the hole having a generally L-shaped profile, and when the drive shaft rotates about the perpendicular axis from its first position to its second position, the projection of the drive shaft and the hole of the bracket cooperate to drive motion of the bracket from its first position to its second position. In an embodiment, the latch also includes a swivel arm coupled to the base so as to be rotatably movable with respect to the base about an axis perpendicular to the perpendicular axis and parallel to the planar portion of the base and constrained from other movement with respect to the base, the bracket is coupled to the swivel arm such that motion of the bracket from its first position to its second position causes rotation of the swivel arm between a first position and a second position, and the swivel arm is coupled to the closure element such that rotation of the swivel arm between its first position and its second position causes motion of the closure element between its first position and its second position.

In an embodiment, the closure element includes a rod and a swivel head, the rod having a first end, a second end opposite the first end of the rod, and a spheroid portion at the second end of the rod, the swivel head having a disc-shaped closure portion with a first side and a second side opposite the first side of the swivel head, and a cup-shaped attachment portion extending from the first side of the closure portion, and the spheroid portion of the rod is secured within the attachment portion of the swivel head such that the swivel head is free to rotate about the spheroid portion of the rod but is restrained from movement away from the rod. In an embodiment, the swivel arm is coupled to the first end of the rod, and when the closure element is in its first position, the swivel head is abuts the adjacent structure.

In an embodiment, the latch also includes a pin, a transverse hole extends through the projection of the base proximate the second end of the projection of the base, the bracket includes a first flange extending from the bottom surface of the bracket along the first side of the bracket, a second flange extending from the bottom surface of the bracket along the second side of the bracket, a first slot extending through the first flange and having a first end and a second end opposite the first end of the first slot, and a second slot extending through the second flange and having a first end and a second end opposite the first end of the second slot, and the pin extends through the first slot of the bracket, the transverse hole of the base, and the second slot of the bracket, whereby an allowable travel of the bracket with respect to the base is defined by the first and second ends of each of the first and second slots of the bracket, wherein the bracket is positioned such that the pin is aligned with the first end of the first slot of the bracket and with the first end of the second slot of the bracket when the bracket is in its first position and is positioned such that pin is aligned with the second end of the first slot of the bracket and with the second end of the second slot of the bracket when the bracket is in its second position.

In an embodiment, the latch also includes a first ring having a first end, a second end opposite the first end of the first ring, a bore defining an inner surface, and an outer surface opposite the inner surface, at least a portion of the outer surface being threaded, the threaded at least a portion of the outer surface of the first ring is threadedly engaged with the threaded at least a portion of the bore of the base, and the plunger is positioned within the bore of the first ring. In an embodiment, the threaded engagement of the threaded at least a portion of the exterior surface of the ring with the threaded at least a portion of the bore of the base is adjustable so as to selectively position the first ring along the perpendicular axis.

In an embodiment, the latch also includes a second ring having a first end, a second end opposite the first end of the second ring, an inner surface, an outer surface opposite the inner surface of the second ring, and a flange extending outwardly from the second end of the second ring, the first ring includes a first portion proximate the first end of the first ring wherein the bore of the first ring defines a first inner diameter, a second portion proximate the second end of the first ring wherein the bore of the first ring defines a second inner diameter that is greater than the first inner diameter, and a shoulder intermediate the first and second portions of the first ring, the second ring is sized and shaped such that, when the first end of the second ring is aligned with the first end of the first ring, the flange of the second ring abuts the shoulder of the first ring, the second ring being slidably movable within the first ring between a first position, in which the flange of the second ring abuts the shoulder of the first ring, and a second position, in which the flange of the second ring is spaced apart from the shoulder of the first ring, the second ring being biased in its first position, and the plunger is positioned within the bore of the second ring.

In an embodiment, the latch also includes a first compression spring positioned between the flange of the second ring and the drive shaft, the first compression spring biasing the second ring to the first position of the second ring. In an embodiment, the first ring includes at least one hole extending through the first portion of the first ring from the bore of the first ring to the outer surface of the first ring, when the second ring is in its first position, the second ring overlaps the at least one hole of the first ring, and when the second ring is in its second position, the second ring does not overlap the at least one hole of the first ring, whereby the at least one hole of the first ring is accessible for insertion of a tool therein to rotate the first ring.

In an embodiment, the latch also includes a second compressing spring and a pin, the base includes a longitudinal hole extending from the bore of the base at least partially through the projection of the base in a direction perpendicular to the perpendicular axis, the longitudinal hole includes a distal end distal to the bore of the base, the second compression spring and the pin are positioned within the longitudinal hole such that the second compression spring is adjacent the distal end of the longitudinal hole and the pin is adjacent the second compression spring opposite the distal end of the longitudinal hole, and the first ring includes an indentation formed within the outer surface of the first ring and positioned so as to be aligned with the longitudinal hole of the base when the first ring is positioned within the bore of the base. In an embodiment, the indentation includes a plurality of flat surfaces and the second compression spring urges the pin against a one of the flat surfaces that is aligned with the longitudinal hole so as to resist rotation of the first ring.

BRIEF DESCRIPTION OF THE DRAWINGS

FIG. 16 is a bottom perspective view of the rotary latch system of FIG. 15;

FIG. 17 is a cross-sectional view of the rotary latch system of FIG. 15, shown positioned with respect to a door to be latched;

DETAILED DESCRIPTION OF THE DRAWINGS

Figure 1:
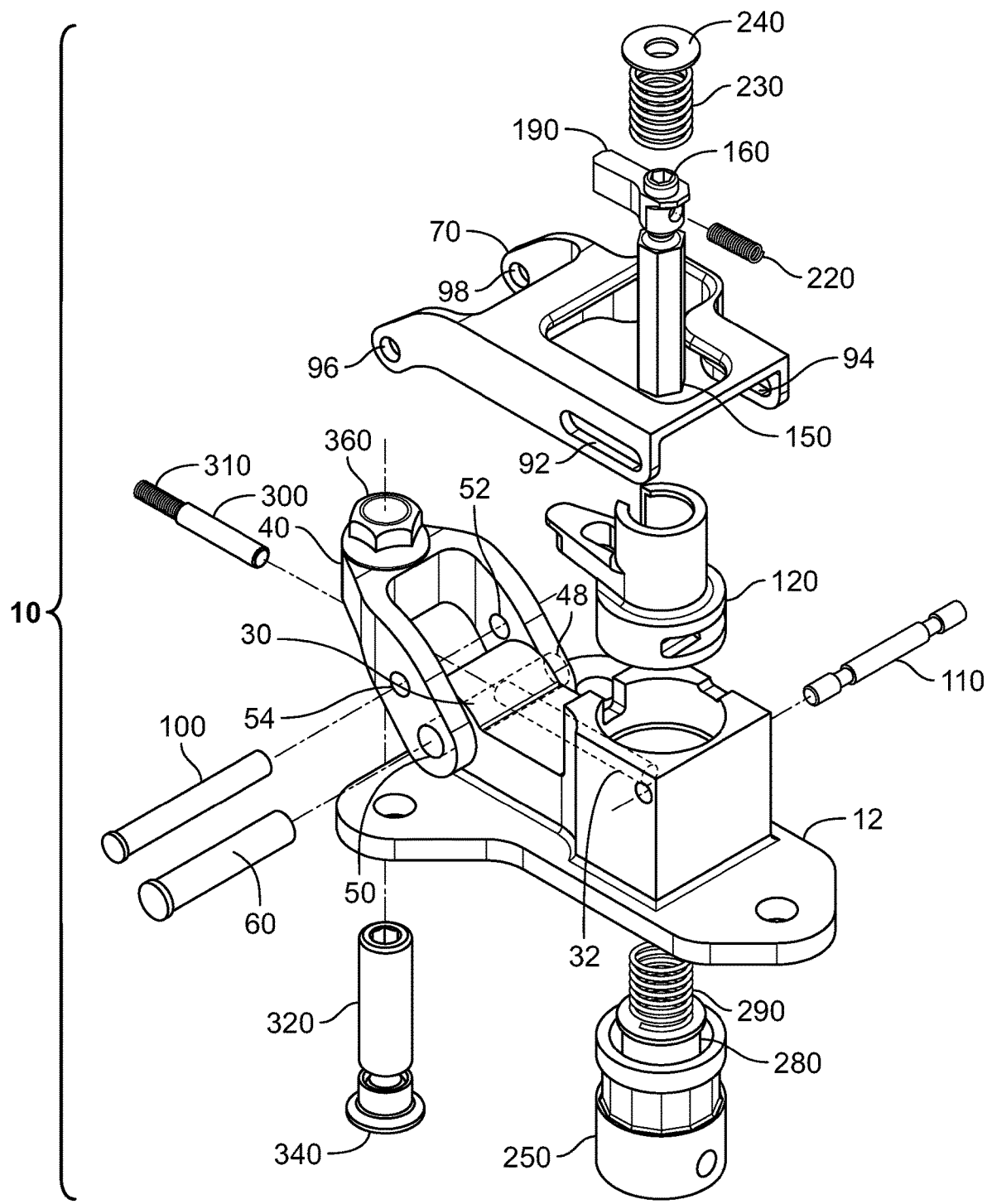
FIG. 1 is an exploded perspective view of a rotary latch system in accordance with an exemplary embodiment.
Figure 2:
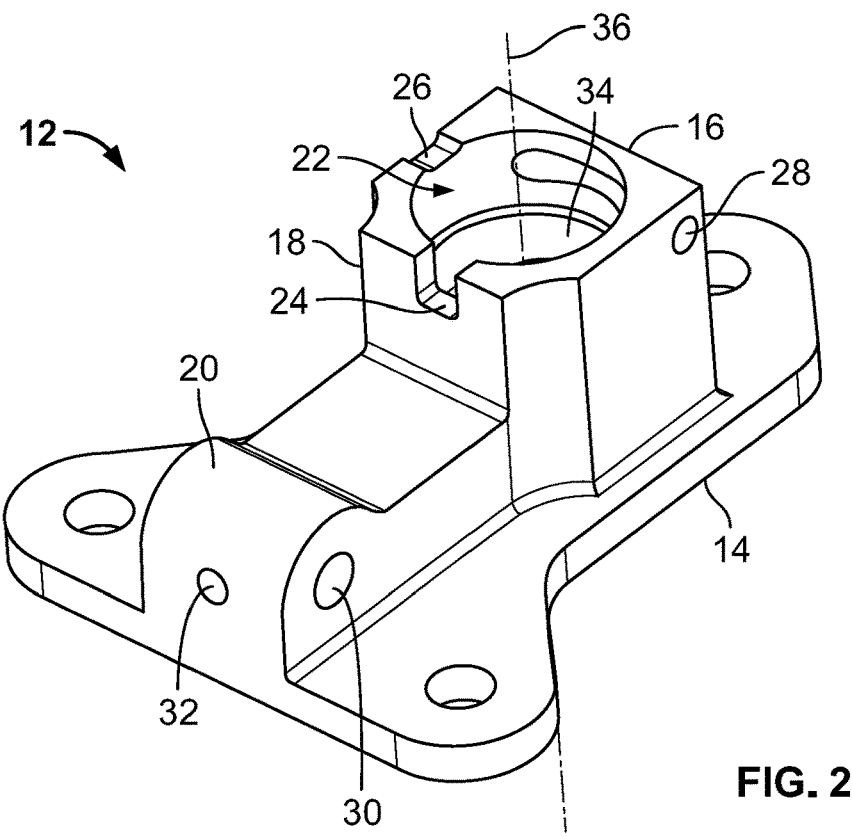
FIG. 2 is a perspective view of a base of the rotary latch system of FIG. 1.

Referring to FIG. 1, an exploded perspective view of a rotary latch system 10 is shown. The elements of the rotary latch system 10 will be described in greater detail hereinafter. Referring to FIG. 2, in an embodiment, the rotary latch system 10 includes a base 12 having a planar portion 14 and a projection 16 extending therefrom. The planar portion 14 is adapted to be affixed to an interior surface of a door to be fastened using the rotary latch system 10. The projection 16 includes a drive portion 18 and a swivel portion 20. A bore 22 extends through the drive portion 18 of the projection 16 and through the planar portion 14. A deep groove 24 is formed in a portion of the projection 16 proximate the swivel portion 20. A shallow groove 26 is formed in a portion of the projection 16 that is offset from the deep groove 24 by a 90 degree angle. A first transverse hole 28 extends through the drive portion 18. A portion of the first transverse hole 28 coincides with the bore 22. A second transverse hole 30 extends through the swivel portion 20. A longitudinal hole 32 extends from a location in the bore 22 proximate the swivel portion 20 and extends through the swivel portion 20. A portion of the longitudinal hole 32 coincides with the second transverse hole 30. An internally threaded portion 34 is formed within the bore 22 and located intermediate the longitudinal hole 32 and the deep groove 24. The bore 22 defines a perpendicular axis 36 that is perpendicular to planar portion 14.

Figure 3:
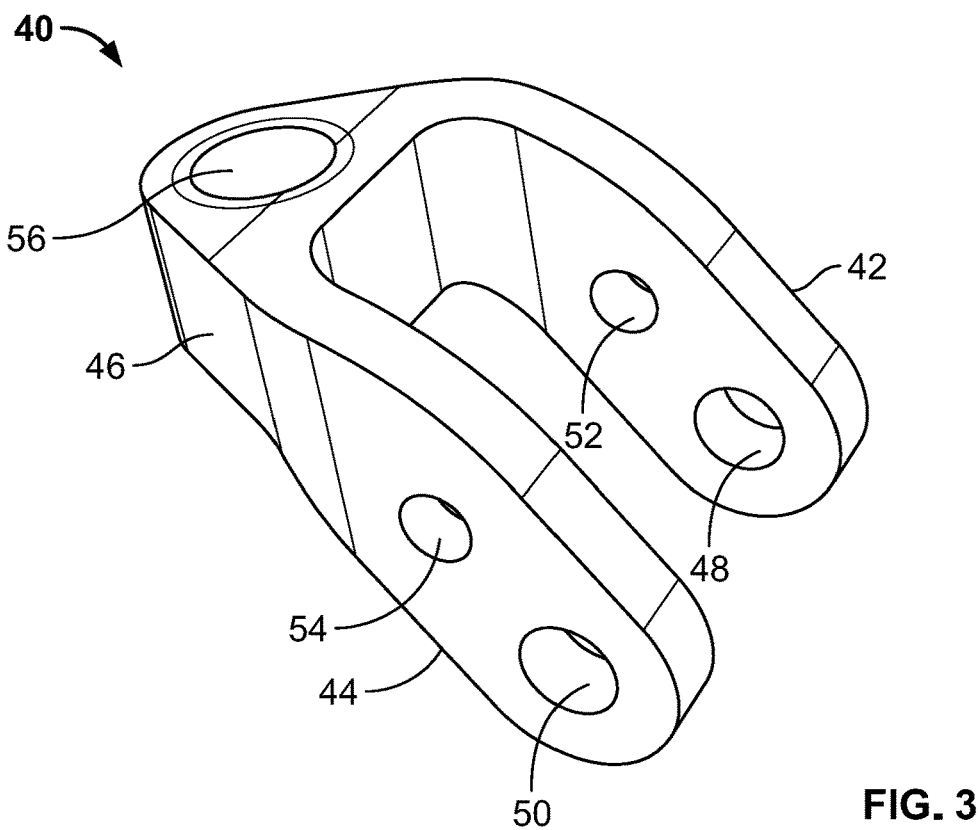
FIG. 3 is a perspective view of a swivel arm of the rotary latch system of FIG. 1.

Referring now to FIG. 3, the rotary latch system 10 includes a generally U-shaped swivel arm 40. The swivel arm 40 has opposed legs 42, 44 extending from a central portion 46. The legs 42, 44 are sized and shaped so as to engage the swivel portion 20 of the base 12 with each of the legs 42, 44 positioned on each side of the swivel portion 20, respectively. The swivel arm 40 includes a first pair of aligned holes 48, 50, each of which extends through a corresponding one of the legs 42, 44. The holes 48, 50 are sized, shaped, and positioned such that, when the legs 42, 44 are positioned on the respective sides of the swivel portion 20, the holes 48, 50 are aligned with the second transverse hole 30. The swivel arm 40 also includes a second pair of aligned holes 52, 54, each of which extends through a corresponding one of the legs 42, 44. The holes 52, 54 are sized, shaped, and positioned such that, when the holes 48, 50 are aligned with the second transverse hole 30 of the base 12, the holes 52, 54 do not overlap any portion of the base 12. The swivel arm 40 also includes a threaded hole 56 extending through the central portion 46.

Referring back to FIG. 1, the swivel arm 40 is affixed to the base 12 by a first rivet 60 extending through the aligned holes 48, 50 of the swivel arm 40 and the hole 30 of the base 12. The first rivet 60 allows the swivel arm 40 to rotate with respect to the base 12 about an axis of the first rivet 60, but constrains other movement of the swivel arm 40 with respect to the base 12.

Figure 4:
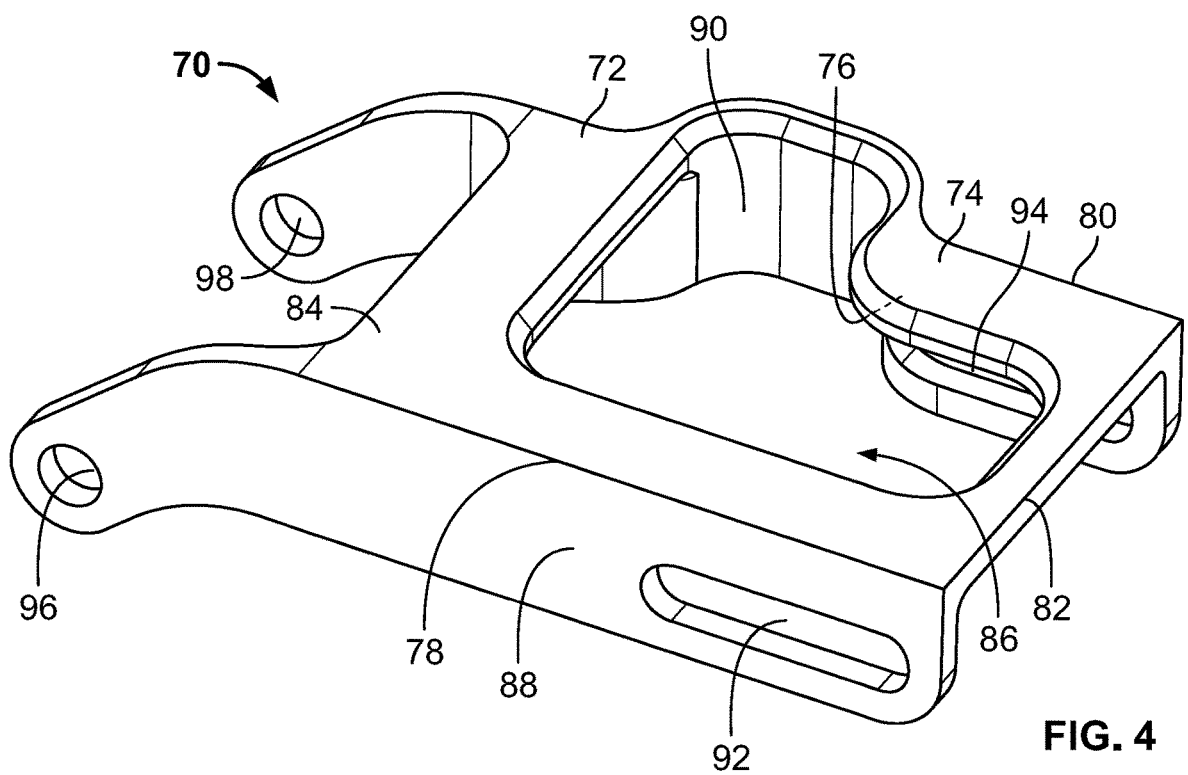
FIG. 4 is a perspective view of a bracket of the rotary latch system of FIG. 1.

Referring now to FIG. 4, the rotary latch system 10 includes a bracket 70. The bracket 70 includes a substantially planar main portion 72 having a first surface 74, a second surface 76 opposite the first surface 74, a first side 78, a second side 80 opposite the first side 78, a first end 82, and a second end 84 opposite the first end 82. A hole 86 having a profile similar to a rounded "L" extends through the main portion 72 of the bracket 70 from the first surface 74 to the second surface 76. A first flange 88 extends away from the second surface 76 along the first side 78. A second flange 90 extends away from the second surface 76 along the second side 80. The first and second flanges 88, 90 extend from the first end 82 and past the second end 84. In an embodiment, the second flange 90 bows away from the main portion 72 to accommodate a portion of the hole 86.

Continuing to refer to FIG. 4, a first elongated slot 92 extends through the first flange 88 from proximate to the first end 82. A second elongated slot 94 extends through the second flange 90 from proximate to the first end 82. The first and second slots 92, 94 are aligned with one another. A hole 96 extends through the first flange 88, while a hole 98 extends through the second flange 90. The holes 96, 98 are aligned with one another and are located in the portions of the first and second flanges 88, 90, respectively, that extend past the second end 84. The main portion 72 and the flanges 88, 90 are sized such that, when the bracket 70 is positioned adjacent the swivel arm 40, the flanges 88, 90 surround the legs 42, 44 of the swivel arm 40 and the holes 96, 98 are aligned with the holes 52, 54 of the swivel arm 40, respectively. The main portion 72 and the flanges 88, 90 are further sized such that, when the bracket 70 is positioned adjacent the base 12, the flanges 88, 90 surround the projection 14 and portions of the slots 92, 94 may be aligned with the first transverse hole 28.

Referring back to FIG. 1, the bracket 70 is affixed to the swivel arm 40 by a second rivet 100 extending through the aligned holes 96, 98 of the bracket 70 and the holes 52, 54 of the swivel arm 40. The second rivet 100 allows the bracket 70 to rotate with respect to the swivel arm 40 about an axis of the second rivet 100, but constrains other movement of the bracket 70 with respect to the swivel arm 40. The bracket 70 is also affixed to the base 12 by a first pin 110 extending through the aligned slots 92, 94 of the bracket 70 and the first transverse hole 28 of the base 12. The first pin 110 is fixed in position with respect to the first transverse hole 28. The bracket 70 may translate (i.e., move) with respect to the base 12 to the extent allowed by the relative motion of the first pin 110 within the slots 92, 94 as the bracket 70 moves with respect to the base 12.

Figure 5:
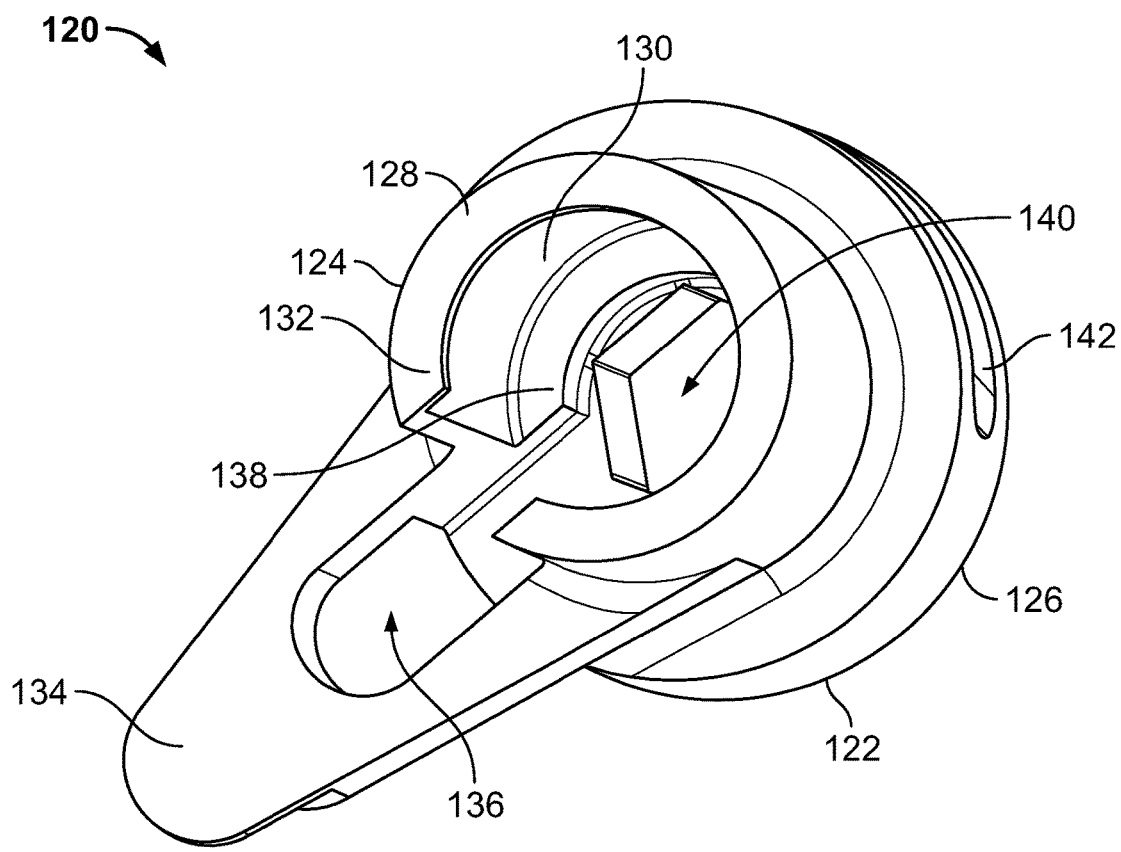
FIG. 5 is a perspective view of a drive shaft of the rotary latch system of FIG. 1.

Referring now to FIG. 5, the rotary latch system 10 includes a substantially cylindrical drive shaft 120 having a first end 122 and a second end 124 opposite the first end 122. The drive shaft 120 includes a first portion 126 proximate the first end 122 and having a first diameter. The drive shaft 120 also includes a second portion 128 proximate the second end 124 and having a second diameter that is less than the first diameter of the first portion 126. A bore 130 extends through the first and second portions 126, 128. A first flange 132 extends inwardly across a portion of the bore 130 at the second end 124. A projection 134 extends from a region of the second portion 128 that is proximate the first portion 126 and in a direction perpendicular to the bore 130. A slot 136 extends from the bore 130 along and partially through the projection 134. A second flange 138 extends inwardly across a portion of the bore 130 proximate the transition between the first portion 126 and the second portion 128. A hexagonal portion 140 of the bore 130 is located between the second flange 138 and first end 122 and has a hexagonal cross-section. A groove 142 is formed within an outer surface of the first portion 126 and extends from a position opposite the projection 134 to a position adjacent the projection 134.

Figure 6:
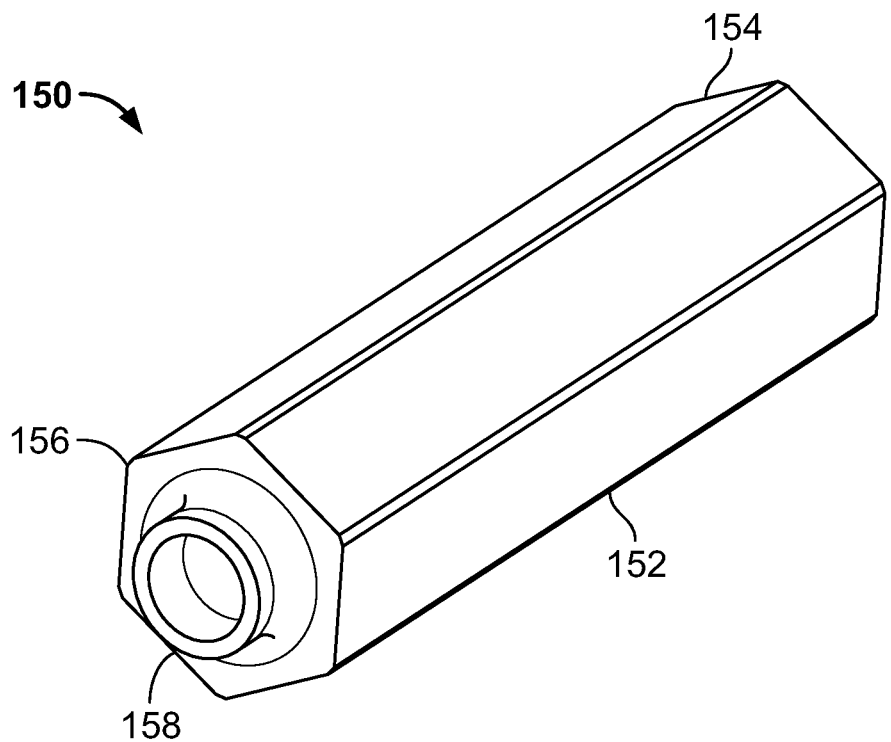
FIG. 6 is a perspective view of a hex plunger of the rotary latch system of FIG. 1.
Figure 7:
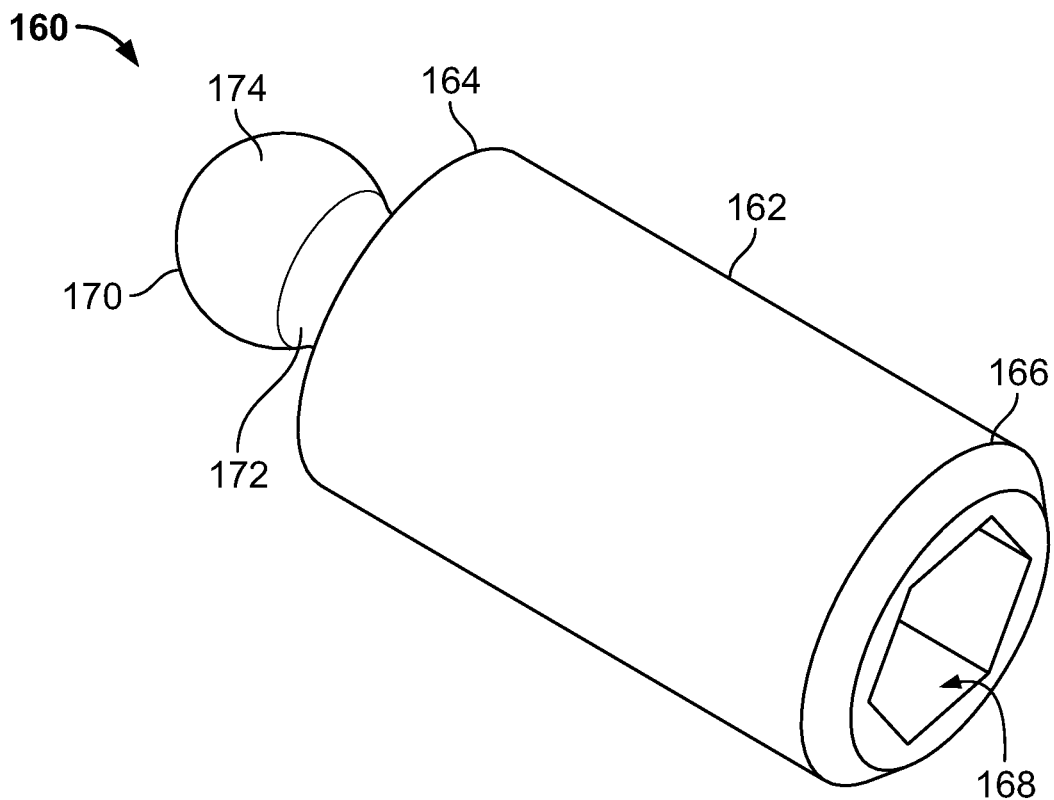
FIG. 7 is a perspective view of a plunger rod of the rotary latch system of FIG. 1.

Referring now to FIG. 6, the rotary latch system 10 includes a hex plunger 150. The hex plunger 150 includes an elongated main portion 152 having a first end 154, a second end 156 opposite the first end 154, and a hexagonal cross-section. A cup 158 extends from the second end 156. Referring now to FIG. 7, the rotary latch system 10 includes a plunger rod 160. The plunger rod 160 has an elongated cylindrical main portion 162 having a first end 164 and a second end 166 opposite the first end 164. A hexagonal recess 168 is formed within the second end 166. A projection 170 extends from the first end 164. The projection 170 includes a transition portion 172 and a spheroid portion 174. The spheroid portion 174 is sized and shaped to be received by the cup 158 of the hex plunger 150. The transition portion 172 has a diameter that is less than a diameter of the spheroid portion 174. In an embodiment, the transition portion 172 provides a smoothly curved transition between the first end 164 and the spheroid portion 174. In an embodiment, the main portion 162 of the plunger rod 160 is threaded.

Figure 8:
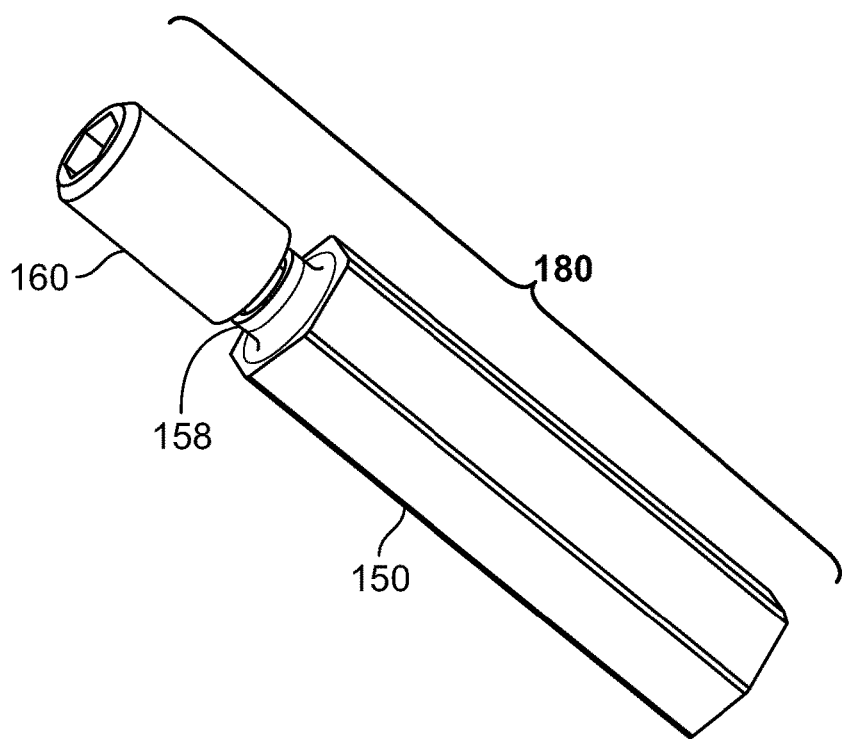
FIG. 8 is a plunger assembly of the rotary latch system of FIG. 1, the plunger assembly including the hex plunger of FIG. 6 and the plunger rod of FIG. 7.

Referring now to FIG. 8, a plunger assembly 180 includes the hex plunger 150 and the plunger rod 160. The plunger assembly 180 is assembled by placing the spheroid portion 174 of the plunger rod 160 within the cup 158 of the hex plunger 150, aligning the hex plunger 150 and the plunger rod 160 such that the elongated main portions 152, 154 are parallel to one another, and swaging the cup 158 over the spheroid portion 174 such that the hex plunger 150 and the plunger rod 160 become fixed to one another.

Figure 9:
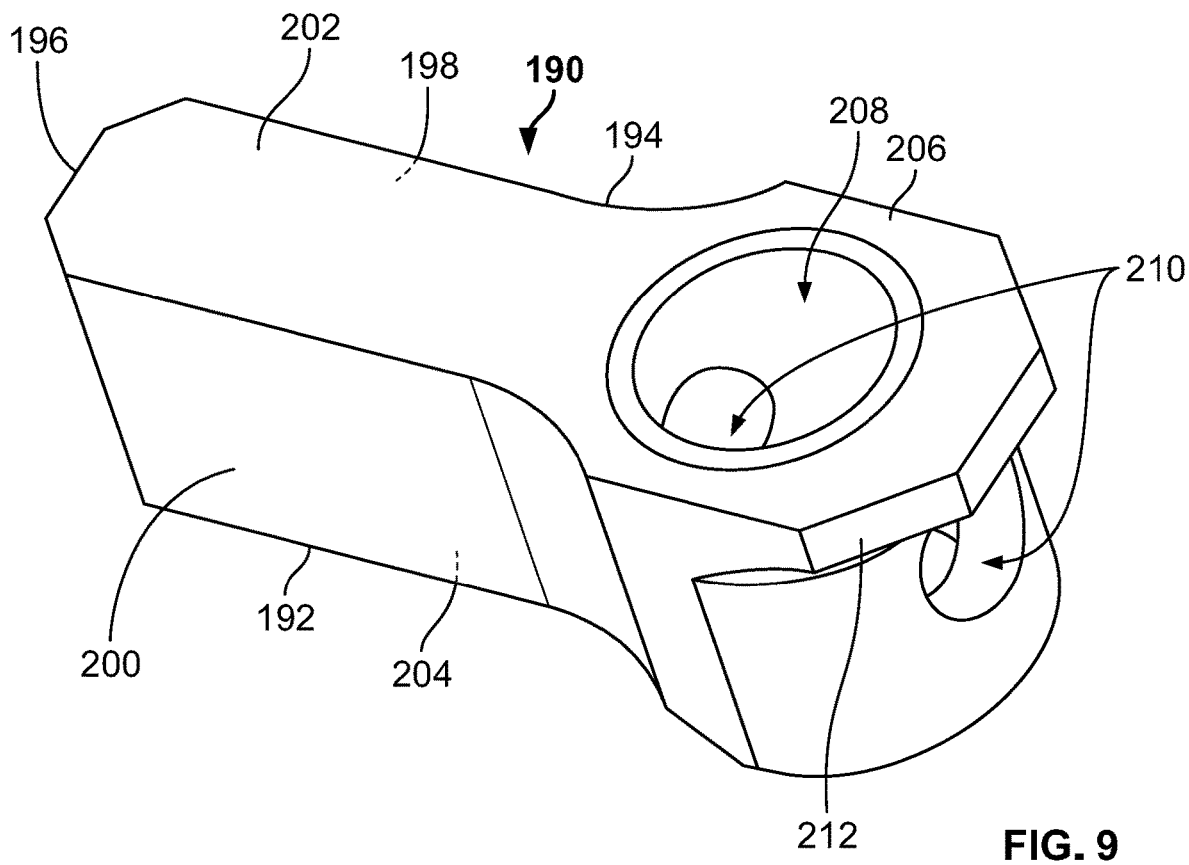
FIG. 9 is a perspective view of a dog leg of the rotary latch system of FIG. 1.

Referring now to FIG. 9, the rotary latch system 10 includes a dog leg 190. The dog leg 190 includes an elongated main portion 192 having a first end 194, a second end 196 opposite the first end 194, a first side 198, a second side 200 opposite the first side 198, a top surface 202, a bottom surface 204 opposite the top surface 202, and a substantially rectangular cross-section. A bulb 206 is located at the first end 194. A threaded bore 208 extends through the bulb 206 from the bottom surface 204 to the top surface 202. A hole 210 extends through the bulb 206 and the main portion 192, but does not penetrate the second end 196. A flange 212 projects from the bulb 206 proximate the top surface 202. In an embodiment, chamfers are formed at the intersection of the first side 198 and the second end 196, at the intersection of the second side 200 and the second end 196, at the intersection of the first side 198 and the bottom surface 206, and at the intersection of the second side 200 and the bottom surface 206.

Figure 10:
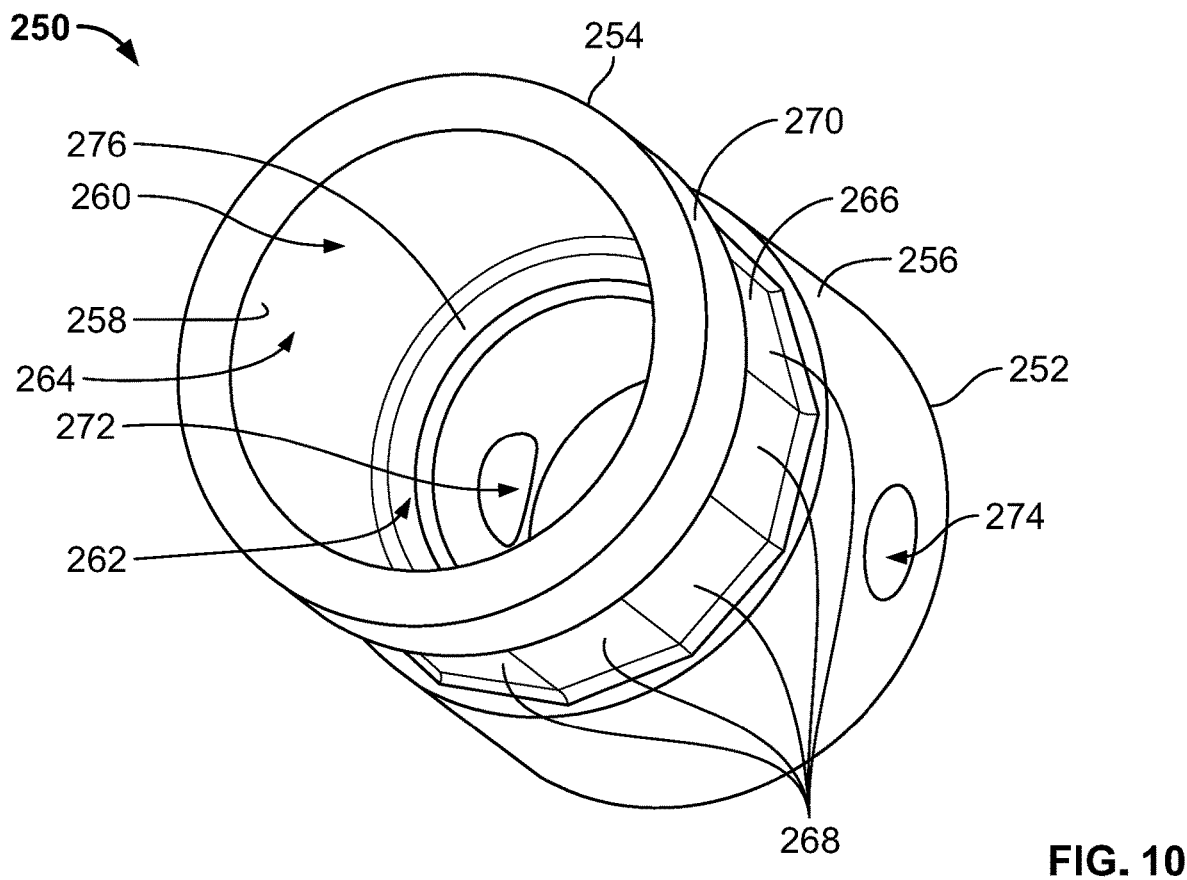
FIG. 10 is a perspective view of a ring of the rotary latch system of FIG. 1.

Referring now to FIG. 10, the rotary latch system 10 includes a ring 250. The ring 250 is substantially tubular and has a first end 252, a second end 254 opposite the first end 252, an outer surface 256, and an inner surface 258 opposite the outer surface 256 and formed by a bore 260. The inner surface 258 includes a first portion 262 proximate the first end 252 and having a first inner diameter. The inner surface 258 also includes a second portion 264 proximate the second end 254 and having a second inner diameter that is greater than the first inner diameter of the first portion 262. An indentation 266 is formed within the outer surface 256 proximate the second end 254. The indentation 266 includes a plurality of flat surfaces 268. In an embodiment, the indentation 266 includes twelve of the surfaces 268. The outer surface 256 includes a threaded portion 270 between the indentation 266 and the second end 254. The threaded portion 270 is adapted to threadedly engage the threaded portion 34 of the bore 22 of the base 12. A first hole 272 and a second hole 274 extend through the ring 250 proximate the first end 252. The first hole 272 and the second hole 274 are diametrically opposed to one another and are angled such that they travel toward the first end 252 as they travel inward from the outer surface 256 to the inner surface 258. A shoulder 276 is formed between the first portion 262 and the second portion 264.

Figure 11:
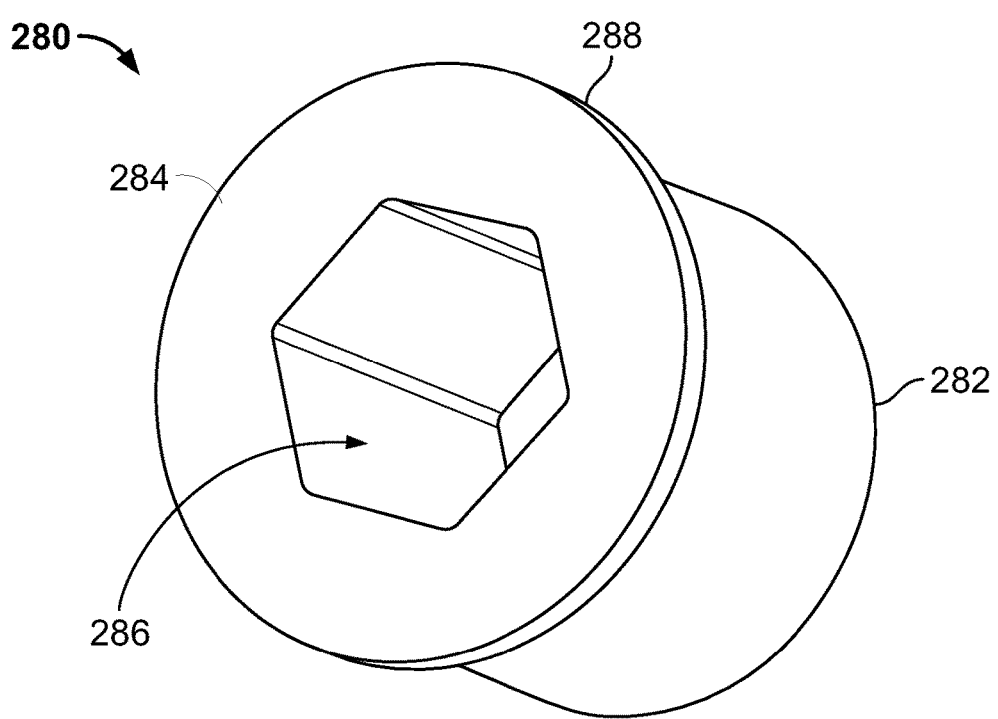
FIG. 11 is a perspective view of an inner ring of the rotary latch system of FIG. 1.

Referring now to FIG. 11, the rotary latch system 10 includes an inner ring 280. The inner ring 280 is substantially cylindrical and has a first end 282 and a second end 284 opposite the first end 282. A hexagonal hole 286 extends through the inner ring 280 from the first end 282 to the second end 284. A flange 288 extends radially outward at the second end 284.

Referring back to FIG. 1, the rotary latch system 10 includes a first compression spring 220, a second compression spring 230, a third compression spring 290, and a fourth compression spring 310. The rotary latch system 10 also includes a washer 240. The rotary latch system also includes a second pin 300. The first compression spring 220 is configured to be positioned within the hole 210 of the dog leg 190. The second compression spring 230 is configured to be positioned within the bore 130 of the drive shaft 120. The third compression spring 290 is configured to be positioned within the ring 250 and to surround the hex plunger 150. The fourth compression spring 310 is configured to be positioned within the longitudinal hole 32 of the base 12. The washer 240 is configured to be positioned within the bore 130 of the drive shaft 120 and to abut the first flange 132 of the drive shaft 120. The second pin 300 is configured to be positioned within the longitudinal hole 32 of the base 12. The specific positioning of the first compression spring 220, the second compression spring 230, the third compression spring 290, the fourth compression spring 310, the washer 240, and the second pin 300 will be described in further detail hereinafter.

Figure 12:
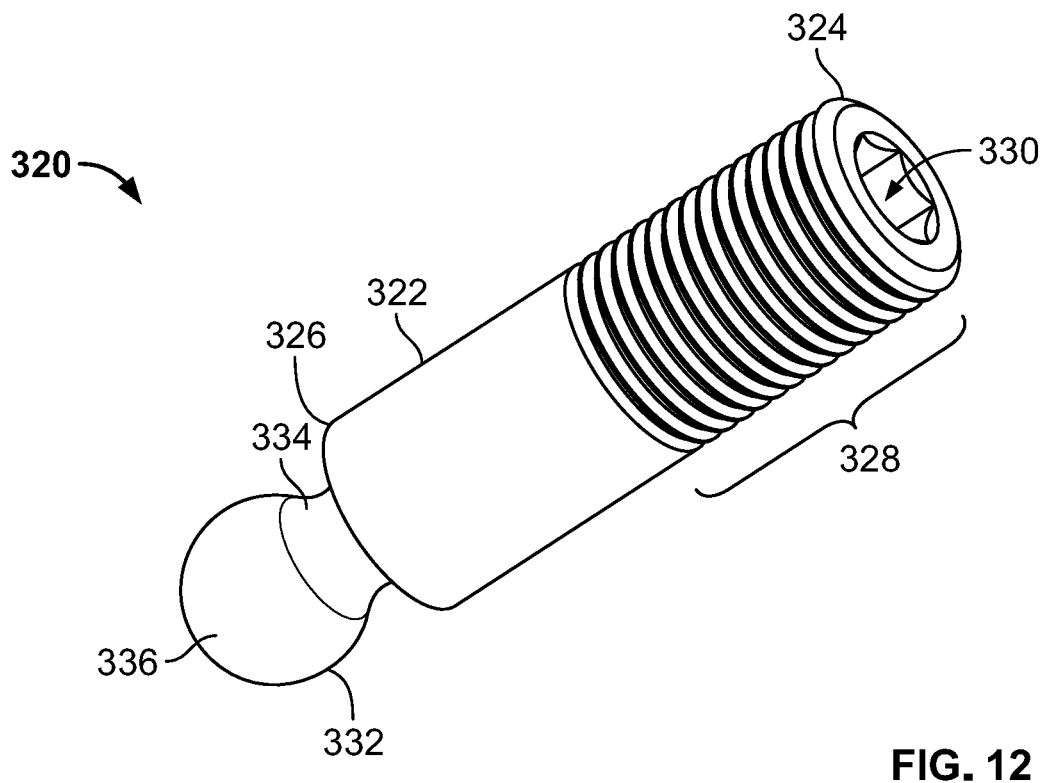
FIG. 12 is a perspective view of a rod of the rotary latch system of FIG. 1.

Referring now to FIG. 12, the rotary latch system 10 includes a rod 320. The rod 320 includes a cylindrical main portion 322 having a first end 324 and a second end 326 opposite the first end 324. The main portion 322 includes a threaded portion 328 proximate the first end 324. In an embodiment, a hexagonal recess 330 is formed in the first end 324. A projection 332 extends from the second end 326. The projection 332 includes a transition portion 334 and a spheroid portion 336. The transition portion 334 has a diameter that is less than a diameter of the spheroid portion 336. In an embodiment, the spheroid portion 336 has a diameter that is less than a diameter of the main portion 322. In an embodiment, the transition portion 334 provides a smoothly curved transition between the second end 326 and the spheroid portion 336.

Figure 13:
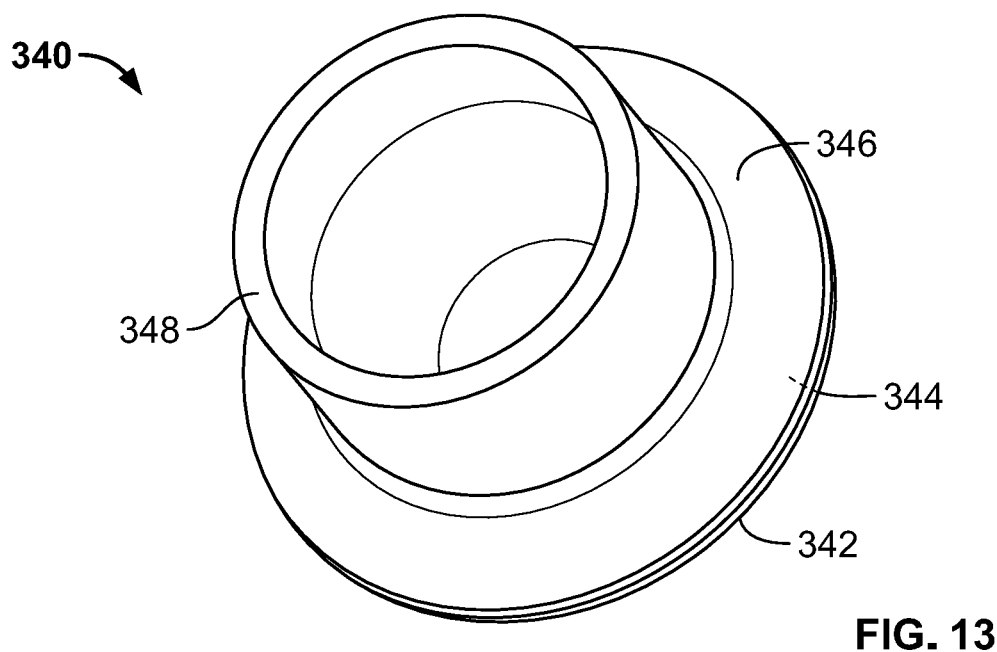
FIG. 13 is a perspective view of a swivel head of the rotary latch system of FIG. 1.

Referring now to FIG. 13, the rotary latch system 10 includes a swivel head 340. The swivel head 340 includes a disc-shaped closure portion 342 having a first side 344 and a second side 346 opposite the first side 344. The swivel head 340 also includes a cup-shaped attachment portion 348 extending from the second side 346. The attachment portion 348 is adapted to receive and be swaged over the spheroid portion 336 of the rod 320, thereby fixing together the swivel head 340 and the rod 320. The combination of the swivel head 340 and the rod 320 may be referred to collectively as a closure element.

Figure 14:
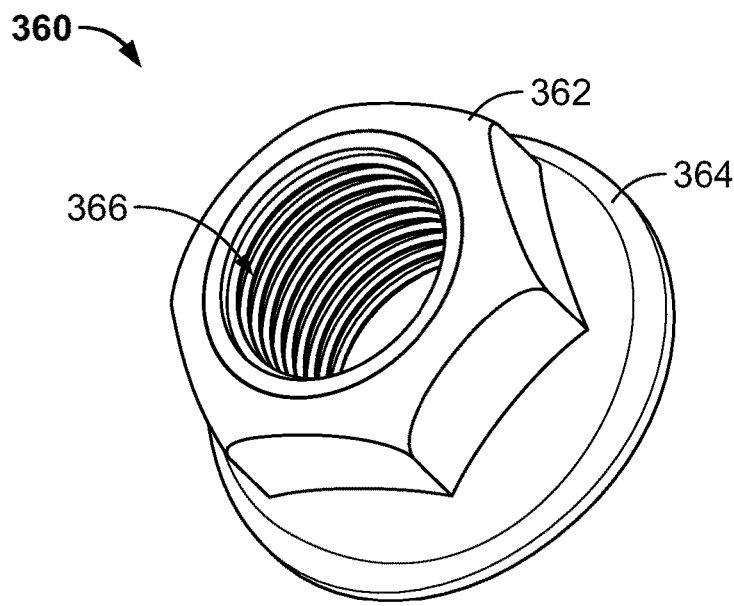
FIG. 14 is a perspective view of a nut of the rotary latch system of FIG. 1.

Referring now to FIG. 14, the rotary latch system 10 includes a nut 360. The nut 360 includes a fastening portion 362 and a bearing portion 364. The fastening portion 362 has a hexagonal profile and is adapted to be gripped by a wrench or other fastening tool. The bearing portion 364 has a circular profile that is adapted to distribute a clamp load evenly when the nut 360 is fastened. A threaded bore 366 extends through the fastening portion 362 and the bearing portion 364. The threaded bore 366 is adapted to threadedly engage the threaded portion of the 328 of the rod 320.

Figure 15:
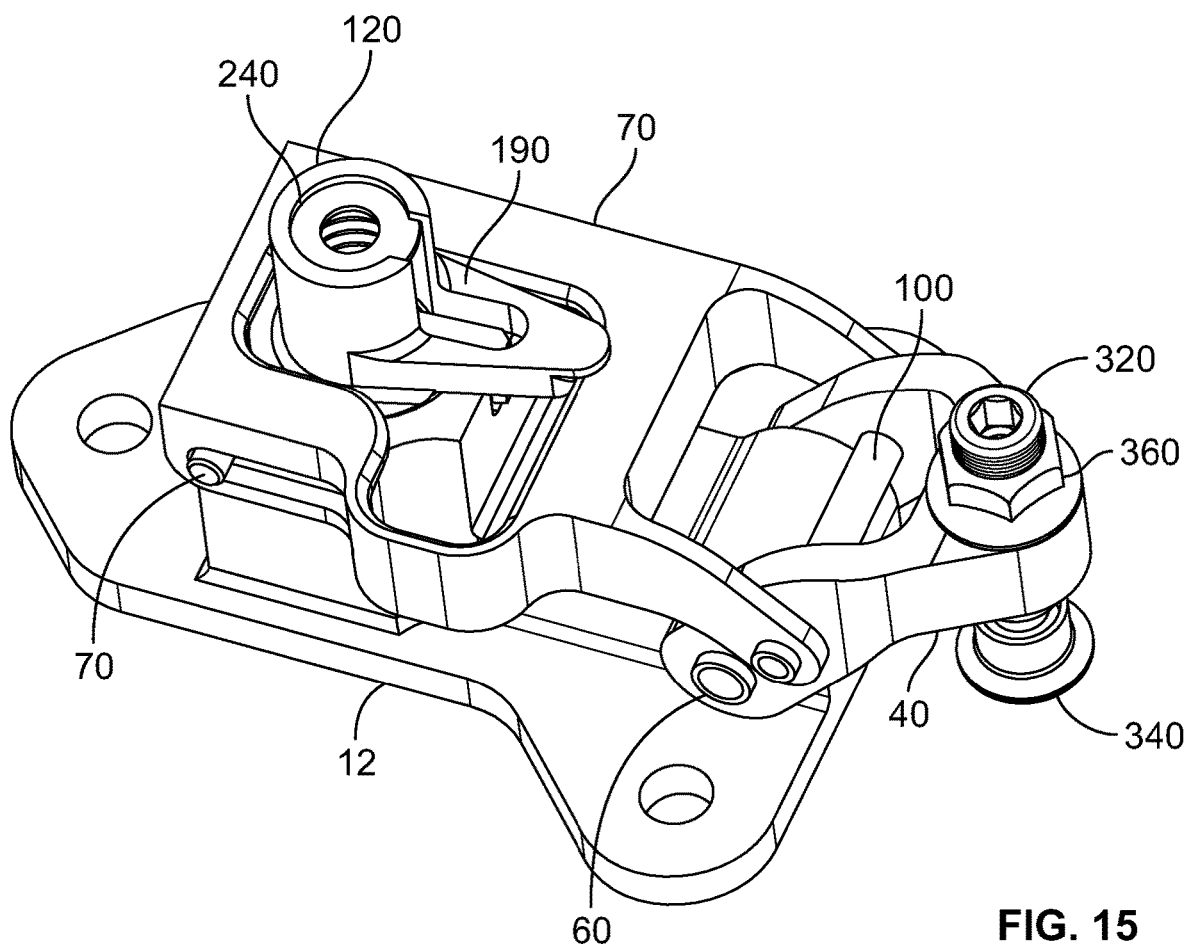
FIG. 15 is a top, front perspective view of the rotary latch system of FIG. 1 as assembled.

Referring now to FIGS. 1 and 15-17, the rotary latch system 10 is shown. More particularly, FIG. 15 shows an assembled perspective view of the rotary latch system 10 as it would be seen from the interior of a door to be fastened by the rotary latch system 10. FIG. 16 shows an assembled perspective view of the rotary latch system 10 as it would be seen from the exterior of a door to be fastened by the rotary latch system 10 (but with the door itself not shown so as not to obscure the rotary latch system 10 from view). FIG. 17 shows a cross-sectional view of the rotary latch system 10 positioned with respect to a door D and sub-structure S to be fastened by the rotary latch system 10, as viewed in a plane passing through the perpendicular axis 36 of the bore 22 of the base 12 and bisecting the base 12. FIGS. 15-17 show the rotary latch system 10 in a closed position.

Referring now to FIG. 17, the ring 250 is installed in the base 12 by threaded engagement of the threaded portion 270 with the threaded portion 34 of the bore 22 of the base 12. The inner ring 280 is disposed within the ring 250, with the flange 288 of the inner ring 280 abutting the shoulder 276 of the ring 250. The inner ring 280 is sized such that, when the flange 288 abuts the shoulder 276 of the ring 250, the first end 282 of the inner ring 280 is aligned with the first end 252 of the ring 250.

Continuing to refer to FIG. 17, the plunger assembly 180 (i.e., the joined combination of the hex plunger 150 and the plunger rod 160) is also disposed within the ring 250 and is positioned such that the first end 154 of the hex plunger 150 is aligned with the first end 282 of the inner ring 280 and with the first end 252 of the ring 250. The mechanism by which the plunger assembly 180 is retained in this position will be described hereinafter. The third compression spring 290 is disposed within the ring 250 is positioned such that it surrounds the hex plunger 150 of the plunger assembly 180 and abuts the flange 288 of the inner ring 280.

Continuing to refer to FIG. 17, the drive shaft 120 is disposed within the bore 22 of the base 12. The drive shaft 120 is positioned such that the first end 122 abuts the third compression spring 290 when the third compression spring 290 is in a semi-compressed state, and such that the groove 142 is aligned with the first transverse hole 28 of the base 12. The first pin 110 is disposed and fixed within the aligned combination of the first transverse hole 28 of the base 12 and the groove 142 of the drive shaft 120. The first pin 110 allows the drive shaft 120 to rotate with respect to the base 12 about the perpendicular axis 36 of the bore 22 of the base 12, but prevents other movement of the drive shaft 120 with respect to the base 12.

Continuing to refer to FIG. 17, the dog leg 190 is positioned within the bore 130 of the drive shaft 120 such that the main portion 192 of the dog leg 190 is positioned within the slot 136 of the drive shaft 120. The position of the dog leg 190 is also such that the main portion 162 of the plunger rod 160 is disposed within and threadedly engaged with the threaded bore 208 of the dog leg 190. The first compression spring 220 is located within the portion of the hole 210 of the dog leg 190 that is formed within the main portion 192 of the dog leg 190 such that it abuts the plunger rod 160. The first compression spring 220 presses against the plunger rod 160 and the dog leg 190 to thereby prevent undesired rotation of the dog leg 190 with respect to the plunger rod 160.

Continuing to refer to FIG. 17, the second compression spring 230 is positioned within the bore 130 of the drive shaft 120 such that it abuts the top surface 202 of the dog leg 190, including the flange 212 thereof. Continuing to refer to FIG. 17, the washer 240 is positioned within the bore 130 of the drive shaft 120 such that the second compression spring 230 is compressed between the washer 240 and the top surface 202, and thereby urges the washer 240 against the first flange 132 of the drive shaft 120.

Continuing to refer to FIG. 17, the fourth compression spring 310 is positioned within the longitudinal hole 32 of the base 12 such that it abuts the first rivet 60 within the second transverse hole 30. The first rivet 60 may therefore be said to act as a distal end of the longitudinal hole 32. The second pin 300 is also positioned within the longitudinal hole 32 of the base 12 and, more specifically, is positioned between the fourth compression spring 310 and the ring 250. More particularly, the position of the ring 250 within the bore 22 of the base 12 results in the second pin 300 being positioned adjacent the one of the flat surfaces 268 of the indentation 266 of the ring 250, and the fourth compression spring 310 urges the second pin 300 against such a one of the flat surfaces 268.

Figure 18:
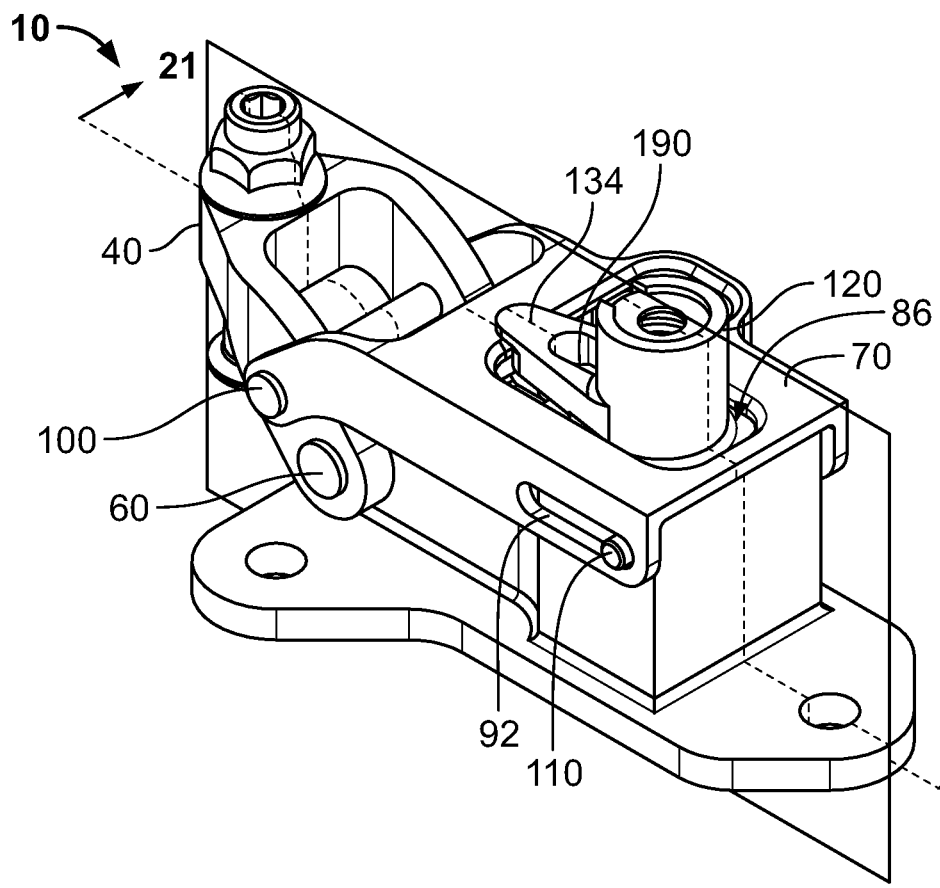
FIG. 18 is a top, rear perspective view of the rotary latch system of FIG. 15, shown in a closed position.
Figure 19:
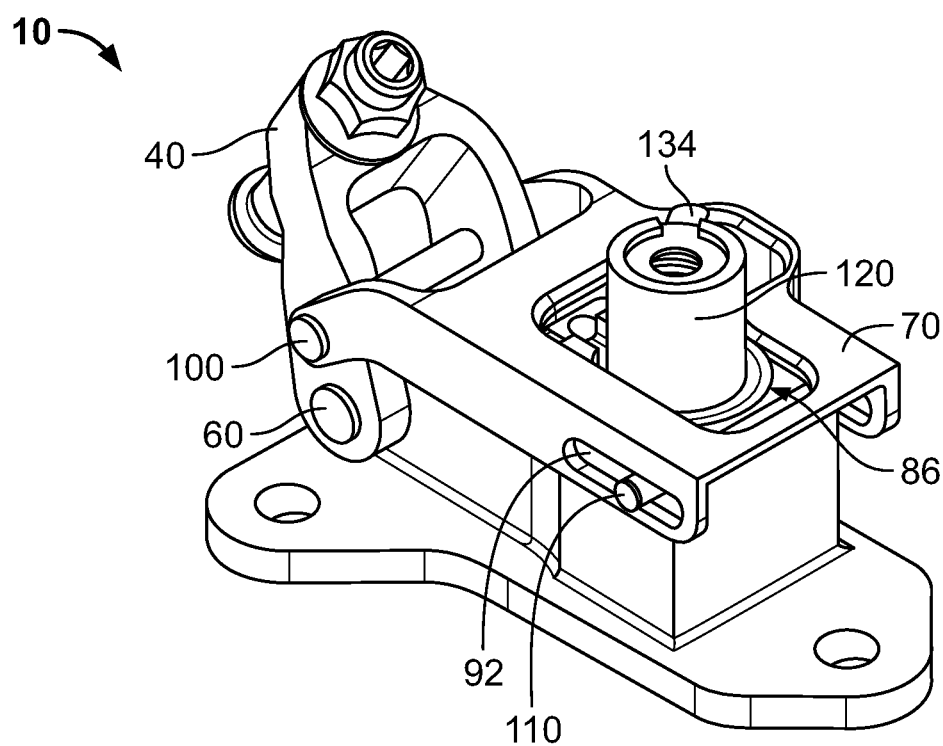
FIG. 19 is a top, rear perspective view of the rotary latch system as shown in FIG. 18, shown in an intermediate position.
Figure 20:
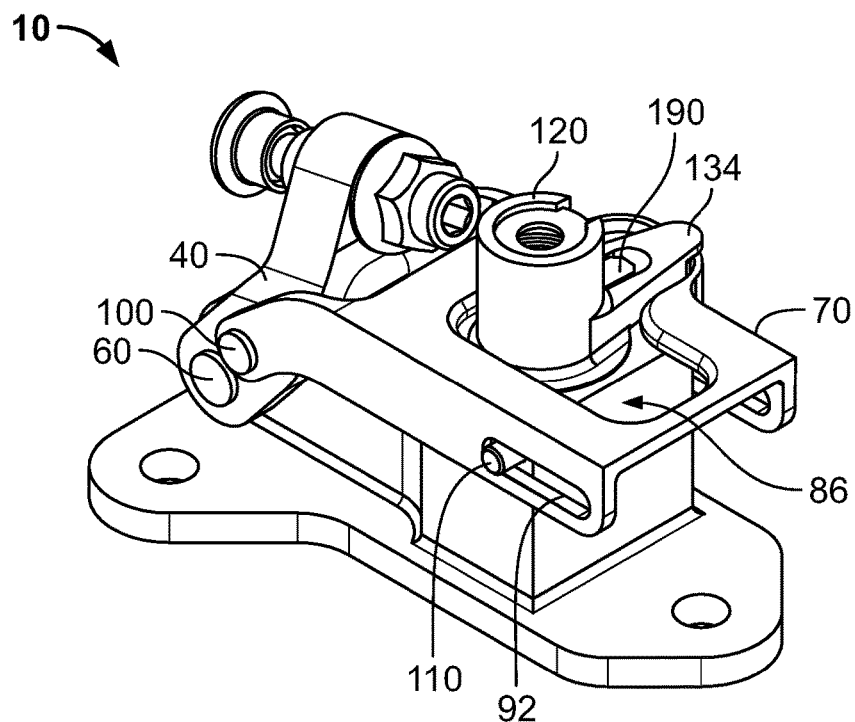
FIG. 20 is a top, rear perspective view of the rotary latch system as shown in FIG. 18, shown in an open position.
Figure 21:
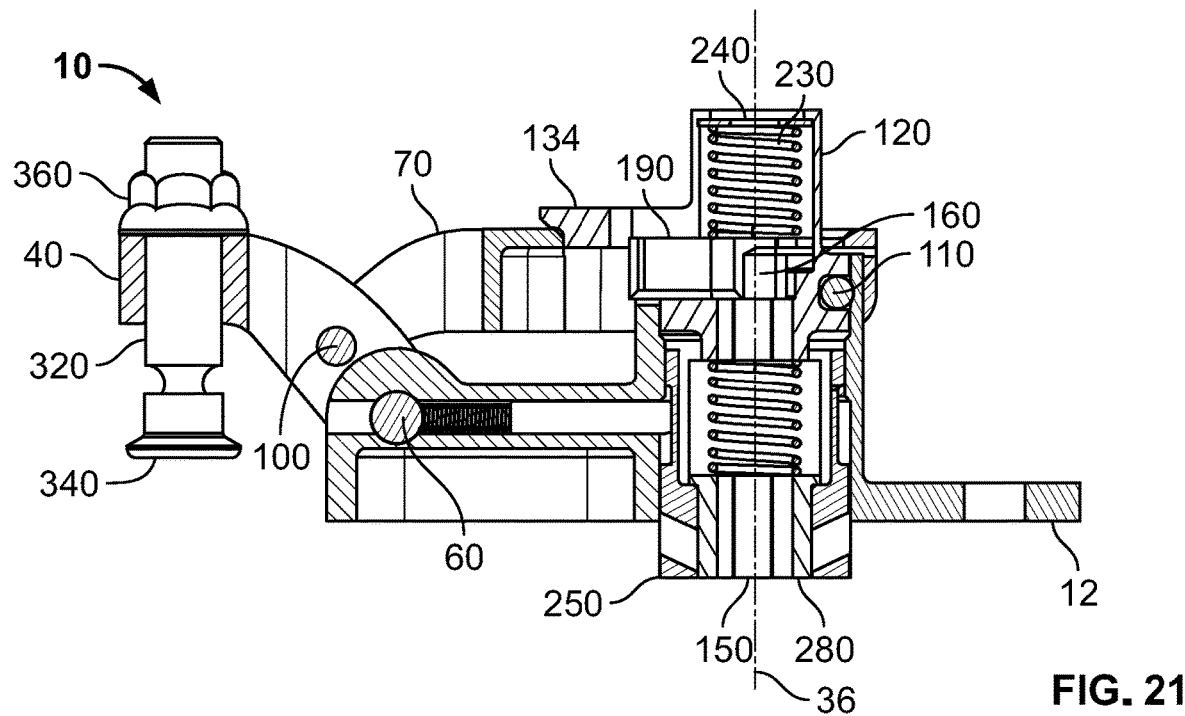
FIG. 21 is a cross-sectional view of the rotary latch system as shown in FIG. 18 taken along the plane 21-21 shown in FIG. 18.
Figure 22:
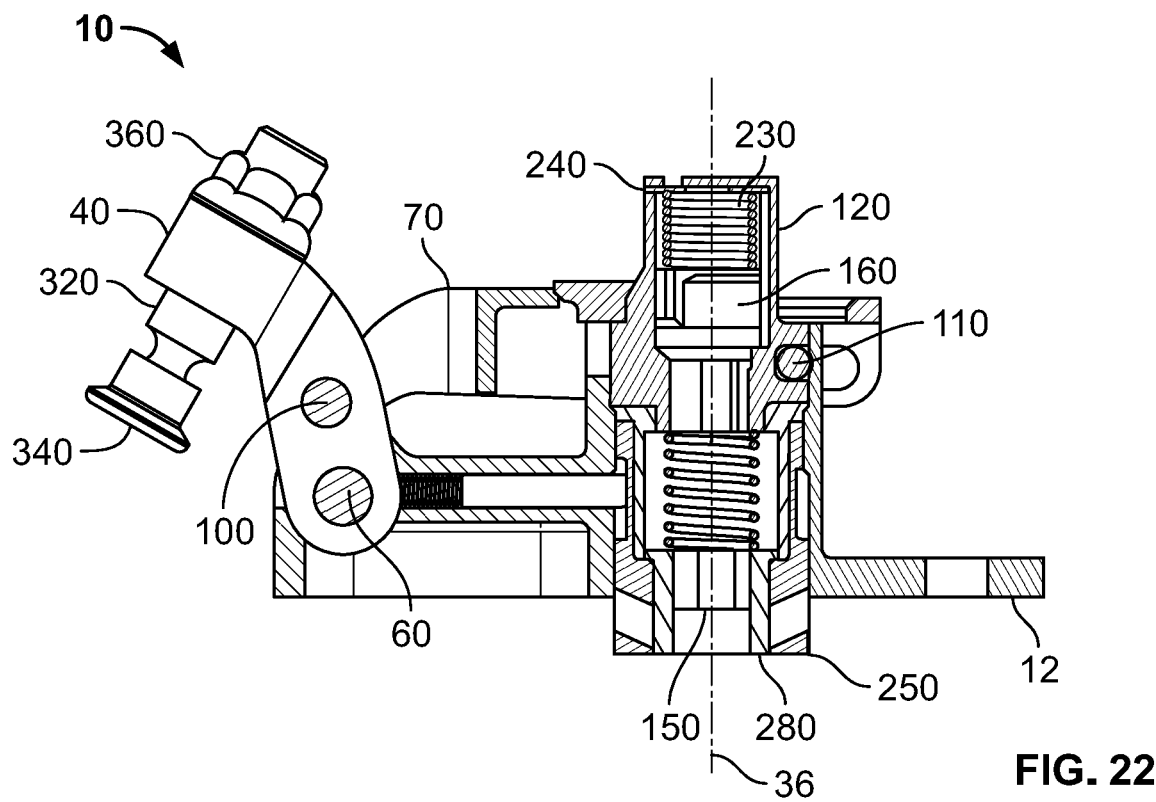
FIG. 22 is a cross-sectional view of the rotary latch system as shown in FIG. 19 taken along the plane 21-21 shown in FIG. 18.
Figure 23:
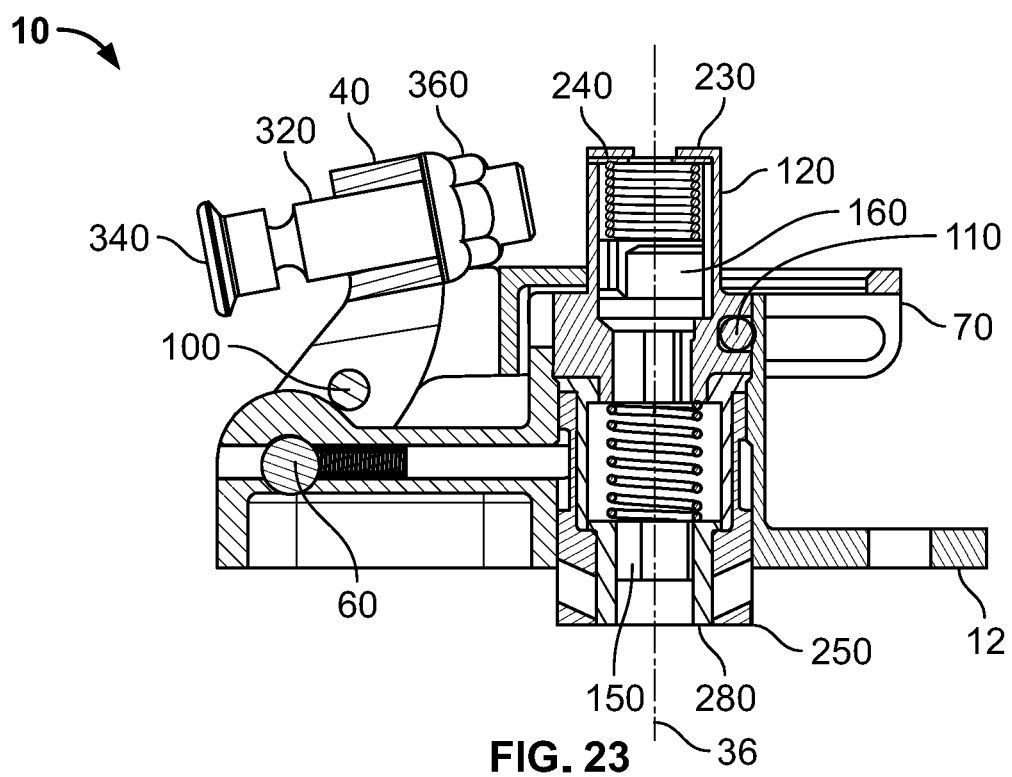
FIG. 23 is a cross-sectional view of the rotary latch system as shown in FIG. 20 taken along the plane 21-21 shown in FIG. 18.

Referring now to FIGS. 18-23, operation of the rotary latch system 10 is described. More particularly, FIGS. 18-20 show perspective views of the rotary latch system 10 from an opposite viewpoint to the perspective view shown in FIG. 15, and in closed, intermediate, and open positions, respectively. FIGS. 21-23 show cross-sectional views of the rotary latch system 10, as viewed in an opposite direction to the cross-sectional view of FIG. 17, and in closed, intermediate, and open positions, respectively.

Referring now to FIGS. 21 and 22, to move the rotary latch system 10 from a closed position to an open position, a user presses against the hex plunger 150 with a hex key (e.g., an Allen wrench), thereby imparting a force through the hex plunger 150, the plunger rod 160 and the dog leg 190, and thereby against the second compression spring 230. By the application of a sufficient force, the hex plunger 150 slides and depresses with respect to the ring 250 and the inner ring 280. Consequently, the dog leg 190 moves out of its resting position within the deep groove 24 of the base 12, but remains within the slot 136 of the drive shaft 120. The user then rotates the hex key (and, thereby, the hex plunger 150, the inner ring 280, and the dog leg 190) counterclockwise by approximately 90 degrees.

Referring now to FIGS. 18-20, because the main portion 192 of the dog leg 190 remains within the slot 136 of the drive shaft 120, rotation of the hex key causes corresponding rotation of the drive shaft 120, such that the projection 134, which extends in a direction toward the swivel portion 20 of the base 12 when the rotary latch system 10 is positioned as described above, rotates to extend perpendicular to its previous alignment. Due to the positioning of the projection 134 of the drive shaft 120 within the L-shaped hole 86 of the bracket 70, rotation of the drive shaft 120 to its alignment as described above causes linear motion of the bracket 70 with respect to the base 12, such that it becomes positioned as shown in FIG. 20. Such motion of the bracket 70, in turn, causes the holes 96, 98 to drive motion of the second rivet 100, which in turn causes the swivel arm 40 to rotate with respect to the base 12 about an axis of the first rivet 60. This rotation brings the swivel arm 40 (and, consequently, the rod 320 and the swivel head 340) into the open position, as shown in FIGS. 20 and 23.

Once the hex plunger 150 and the other elements described above have been rotated such that the rotary latch system 10 is in its open position, the user may release the pressure being exerted thereon by the hex key. The second compression spring 230 will urge the dog leg 190 into a position within the shallow groove 26 of the base 12, from which position the dog leg 190 (and, consequently, the hex plunger 150) cannot be further rotated without reapplying pressure to the hex plunger 150. To close the rotary latch system 10, reverse steps of the sequence described above are conducted.

The rotary latch system 10 may also be adjusted in two ways. First, the position of the hex plunger 150 may be adjusted to ensure that the first end 154 of the hex plunger 150 is flush with the first end 252 of the ring 250 and with the first end 282 of the inner ring 280. To accomplish such adjustment, when the rotary latch system 10 is positioned in the closed position (as shown in FIGS. 15-17), a user may insert a hex key into the hexagonal recess 168 of the plunger rod 160 and rotate the plunger rod 160 therewith. Such rotation will adjust the threaded engagement of the plunger rod 160 with the dog leg 190 because the dog leg 190 is restrained from corresponding rotation by its position in the deep groove 24 of the base 12, thereby altering the axial position of the plunger rod 160. Because the plunger rod 160 and the hex plunger 150 are fixed to one another, axial adjustment of the plunger rod 160 causes equivalent rotation of the hex plunger 150. The user may thereby adjust the hex plunger 150 to a position as described above.

Figure 24:
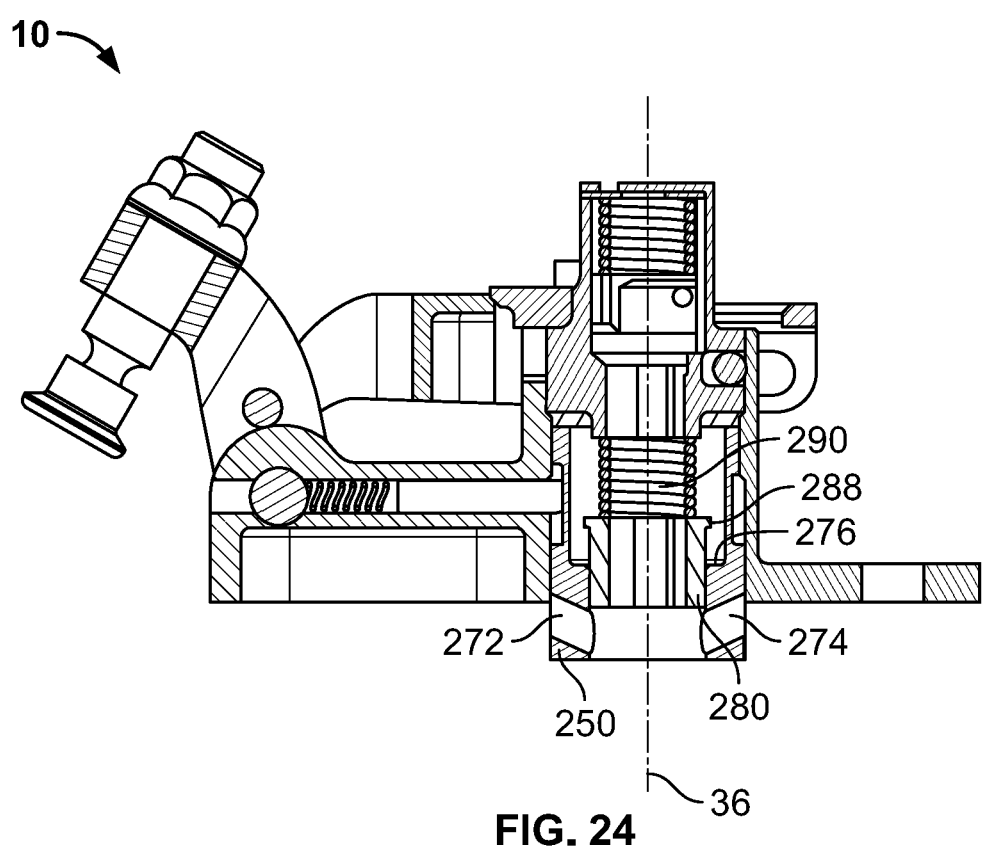
FIG. 24 is a cross-sectional view of the rotary latch system as shown in FIG. 20 taken along the plane 21-21 shown in FIG. 18, showing the inner ring depressed to adjust the position of the ring.

Referring now to FIG. 24, the rotary latch system 10 may also be adjusted to reposition the ring 250 (i.e., to adjust the positioning of the first end 252 of the ring 250 with respect to the planar portion 14 of the base 12). To accomplish such adjustment, when the rotary latch system 10 is in the open position (as shown in FIGS. 20 and 23), a user may depress the inner ring 280 with respect to the ring 250 (e.g., by pressing thereon with a hex key). Depression of the inner ring 280 reveals the first and second holes 272, 274 of the ring 250; the holes 272, 274 were previously obscured on one end by the inner ring 280 and on the other end by the door D onto which the rotary latch system 10 is installed (see FIG. 17). While holding the inner ring 280 in the depressed position with the hex key (see FIG. 24), the user may insert the hex key into either of the holes 272, 274 and turn the hex key to rotate the ring 250. When such action is taken, the rotation of the ring 250 is resisted by the second pin 300, which is urged against one of the flat surfaces 268 of the indentation 266 of the ring 250 by the fourth compression spring 310, and thus acts to retain the ring 250 in its existing position. Such rotation adjusts the threaded engagement of the ring 250 with the threaded portion 34 of the bore 22 of the base 12, thereby adjusting the extent to which the first end 252 of the ring 250 protrudes from the base 12. The user may thereby adjust the ring 250 to be flush with a door D onto which the rotary latch system 10 is installed. Once adjustment is complete, the user may release the inner ring 280. The inner ring 280 then returns to a position such that the first end 282 of the inner ring 280 is flush with the first end 252 of the ring 250 due to the abutment of the flange 288 of the inner ring 280 against the shoulder 276 of the ring 250, with the inner ring 280 being urged into such position by the third compression spring 290.

The exemplary embodiment provides tight gaps among the ring 250, the inner ring 280, and the hex plunger 150. The exemplary embodiment provides a positive lock with a visual indication that the hex plunger 150 is recessed when the rotary latch system 10 is in the open position. The exemplary embodiment provides for adjustments of the hex plunger 150 and the ring 250 to compensate for installation on doors of variable thickness. In an embodiment, the exemplary rotary latch system 10 is adapted for use in the aerospace field, such as aerospace doors, nacelles, etc. In other embodiments, the exemplary rotary latch system can be used in other fields and applications.

It should be understood that the embodiments described herein are merely exemplary and that a person skilled in the art may make many variations and modifications without departing from the spirit and scope of the invention. All such variations and modifications are intended to be included within the scope of the invention as exemplified by the appended claims.

What is claimed is:

1. A latch, comprising:
  a base including a planar portion and a projection, said planar portion having a first side and a second side opposite said first side, said planar portion being adapted to be secured to a first structure such that said first side of said planar portion abuts the first structure, said projection protruding from said second side of said planar portion and having a first end at said second side of said planar portion and a second end opposite said first end, the base further including a bore extending from said first side of said planar portion to said second end of said projection, at least a portion of said bore being internally threaded, said bore defining a perpendicular axis that is perpendicular to said planar portion;
  an elongated plunger having a first end and a second end opposite said first end of said plunger, wherein said second end of said plunger is threaded, said plunger being movably positioned within said bore of said base so as to be oriented along the perpendicular axis and rotatable about the perpendicular axis between at least a first position and a second position;

a dog leg having a first end, a second end opposite said first end of said dog leg, a top surface, a bottom surface opposite said top surface, a bulb formed at said first end of said dog leg, and a threaded bore extending through said bulb from said bottom surface to said top surface, wherein said threaded bore of said dog leg is threadedly engaged with said second end of said plunger;

a drive shaft positioned adjacent said second end of said projection of said base and coupled to said base so as to be rotatable about the perpendicular axis but constrained from other motion, said drive shaft being coupled to said second end of said plunger such that rotation of said plunger between its first position and its second position causes said drive shaft to rotate about the perpendicular axis between a first position and a second position;

a bracket positioned adjacent said second end of said projection of said base and coupled to said base so as to be linearly movable along an axis that is parallel to said planar portion of said base and perpendicular to the perpendicular axis, said bracket being coupled to said drive shaft such that rotation of said drive shaft between its first position and its second position causes linear motion of said bracket between a first position and a second position; and a closure element coupled to said bracket such that the linear motion of said bracket between its first position and its second position causes motion of said closure element between a first position and a second position, wherein, when said closure element is in its first position, said closure element abuts a second structure adjacent the first structure so as to prevent movement of the first structure with respect to the second structure, and wherein, when said closure element is in its second position, said closure element is positioned so as to allow movement of the first structure with respect to the second structure.

2. The latch of claim 1, wherein said drive shaft includes a substantially cylindrical portion having a first end, a second end, a bore extending from said first end of said substantially cylindrical portion to said second end of said substantially cylindrical portion, a projection extending from said substantially cylindrical portion intermediate said first and second ends of said substantially cylindrical portion, and a slot extending from said bore of said substantially cylindrical portion along and at least partially through said projection, said slot being sized and shaped to receive said dog leg, wherein said plunger is positioned within said bore of said drive shaft, wherein said dog leg is positioned within said slot of said drive shaft, and wherein rotation of said dog leg within said slot of said drive shaft and about the perpendicular axis, by rotation of the plunger between its first position and its second position, causes the corresponding rotation of said drive shaft about the perpendicular axis between its first position and its second position.

3. The latch of claim 2, wherein said base includes a first groove within said second end of said projection and a second groove within said second end of said projection, said first and second grooves being angularly offset from one another about the perpendicular axis such that when said plunger is in its first position, said dog leg is rotationally aligned with said first groove, and such that when said plunger is in its second position, said dog leg is rotationally aligned with said second groove.

4. The latch of claim 3, wherein a position of said dog leg along the perpendicular axis is biased such that said dog leg engages one of said first and second grooves of said base when said dog leg is rotationally aligned with one of said first and second grooves of said base, whereby when said dog leg engages one of said first and second grooves of said base, said dog leg is constrained from rotation about the perpendicular axis, and whereby said drive shaft is constrained from rotation about the perpendicular axis between its first position and its second position.

5. The latch of claim 4, further comprising a compression spring, wherein said drive shaft includes a flange extending at least partially across said bore at said second end of said drive shaft, and wherein said compression spring is positioned between said dog leg and said flange of said drive shaft so as to bias the position of said dog leg along the perpendicular axis.

6. The latch of claim 4, wherein when said dog leg engages one of said first and second grooves of said base, said plunger is rotatable with respect to said dog leg about the perpendicular axis, wherein said threaded engagement of said second end of said plunger with respect to said bore of said dog leg causes rotation of said plunger about the longitudinal axis resulting in motion of said plunger along the perpendicular axis, whereby a position of said plunger along the perpendicular axis is adjustable.

7. The latch of claim 1, wherein said drive shaft includes a substantially cylindrical portion having a first end, a second end, a bore extending from said first end of said substantially cylindrical portion to said second end of said substantially cylindrical portion, and a projection extending from said substantially cylindrical portion intermediate said first and second ends of said substantially cylindrical portion, wherein said bracket includes a bottom surface facing said base, a top surface opposite said bottom surface, a first side, a second side opposite said first side of said bracket, and a hole extending through said bracket from said bottom surface to said top surface, said hole having a generally L-shaped profile, and wherein when said drive shaft rotates about the perpendicular axis between its first position and its second position, said projection of said drive shaft and said hole of said bracket cooperate to drive the linear motion of said bracket between its first position and its second position.

8. The latch of claim 7, further comprising a swivel arm coupled to said base so as to be rotatably movable with respect to said base about an axis perpendicular to the perpendicular axis and parallel to said planar portion of said base and constrained from other movement with respect to said base, wherein said bracket is coupled to said swivel arm such that the linear motion of said bracket between its first position and its second position causes rotation of said swivel arm between a first position and a second position, and wherein said swivel arm is coupled to said closure element such that the rotation of said swivel arm between its first position and its second position causes the motion of said closure element between its first position and its second position.

9. The latch of claim 8, wherein said closure element includes a rod having a first end, a second end opposite said first end of said rod, and a spheroid portion at said second end of said rod; and
a swivel head having a disc-shaped closure portion with a first side and a second side opposite said first side of said closure portion, and a cup-shaped attachment portion extending from said first side of said closure portion, and
wherein said spheroid portion of said rod is secured within said attachment portion of said swivel head such that said swivel head is free to rotate about said spheroid portion of said rod but is restrained from movement away from said rod.

10. The latch of claim 9, wherein said swivel arm is coupled to said first end of said rod, and wherein when said closure element is in its first position, said swivel head abuts the second structure.

11. The latch of claim 7, further comprising a pin,
wherein a transverse hole extends through said projection of said base proximate said second end of said projection of said base,
wherein said bracket includes a first flange extending from said bottom surface of said bracket along said first side of said bracket, a second flange extending from said bottom surface of said bracket along said second side of said bracket, a first slot extending through said first flange and having a first end and a second end opposite said first end of said first slot, and a second slot extending through said second flange and having a first end and a second end opposite said first end of said second slot, and
wherein said pin extends through said first slot of said bracket, said transverse hole of said base, and said second slot of said bracket, whereby an allowable travel of said bracket with respect to said base is defined by said first and second ends of each of said first and second slots of said bracket, wherein said bracket is positioned such that said pin is aligned with said first end of said first slot of said bracket and with said first end of said second slot of said bracket when said bracket is in its first position and is positioned such that said pin is aligned with said second end of said first slot of said bracket and with said second end of said second slot of said bracket when said bracket is in its second position.

12. A latch, comprising:
a base including a planar portion and a projection, said planar portion having a first side and a second side opposite said first side, said planar portion being adapted to be secured to a first structure such that said first side of said planar portion abuts the first structure, said projection protruding from said second side of said planar portion and having a first end at said second side of said planar portion and a second end opposite said first end, the base further including a bore extending from said first side of said planar portion to said second end of said projection, at least a portion of said bore being internally threaded, said bore defining a perpendicular axis that is perpendicular to said planar portion;
an elongated plunger having a first end and a second end opposite said first end of said plunger, said plunger being positioned within said bore of said base so as to be oriented along the perpendicular axis and rotatable about the perpendicular axis between at least a first position and a second position;
first ring having a first end, a second end opposite said first end of said first ring, a bore defining an inner surface, and an outer surface opposite said inner surface, at least a portion of said outer surface being threaded, wherein said at least a portion of said outer surface of said first ring is threadedly engaged with said at least a portion of said bore of said base being internally threaded, and wherein said plunger is positioned within said bore of said first ring;
a drive shaft positioned adjacent said second end of said projection of said base and coupled to said base so as to be rotatable about the perpendicular axis but constrained from other motion, said drive shaft being coupled to said second end of said plunger such that rotation of said plunger between its first position and its second position causes said drive shaft to rotate about the perpendicular axis between a first position and a second position;
a bracket positioned adjacent said second end of said projection of said base and coupled to said base so as to be linearly movable along an axis that is parallel to said planar portion of said base and perpendicular to the perpendicular axis, said bracket being coupled to said drive shaft such that rotation of said drive shaft between its first position and its second position causes linear motion of said bracket between a first position and a second position; and
a closure element coupled to said bracket such that the linear motion of said bracket between its first position and its second position causes motion of said closure element between a first position and a second position, wherein, when said closure element is in its first position, said closure element abuts a second structure adjacent the first structure so as to prevent movement of the first structure with respect to the second structure, and wherein, when said closure element is in its second position, said closure element is positioned so as to allow movement of the first structure with respect to the second structure.

13. The latch of claim 12, wherein said threaded engagement of said at least a portion of said outer surface of said first ring with said at least a portion of said bore of said base is adjustable so as to selectively position said first ring along the perpendicular axis.

14. The latch of claim 13, further comprising a second ring having a first end, a second end opposite said first end of said second ring, an inner surface, an outer surface opposite said inner surface of said second ring, and a flange extending outwardly from said second end of said second ring,
wherein said first ring includes a first portion proximate said first end of said first ring wherein said bore of said first ring defines a first inner diameter, a second portion proximate said second end of said first ring wherein said bore of said first ring defines a second inner diameter that is greater than said first inner diameter, and a shoulder intermediate said first and second portions of said first ring,
wherein said second ring is sized and shaped such that, when said first end of said second ring is aligned with said first end of first ring, said flange of said second ring abuts said shoulder of said first ring, said second ring being slidably movable within said first ring between a first position, in which said flange of said second ring abuts said shoulder of said first ring, and a second position, in which said flange of said second ring is spaced apart from said shoulder of said first ring, said second ring being biased in its first position, and wherein said plunger is positioned within said bore of said second ring.

15. The latch of claim 14, further comprising a first compression spring positioned between said flange of said second ring and said drive shaft, said first compression spring biasing said second ring to the first position of said second ring.

16. The latch of claim 15, wherein said first ring includes at least one hole extending through said first portion of said first ring from said bore of said first ring to said outer surface of said first ring, wherein when said second ring is in its first position, said second ring overlaps said at least one hole of said first ring, and wherein when said second ring is in its second position, said second ring does not overlap said at least one hole of said first ring, whereby said at least one hole of said first ring is accessible for insertion of a tool therein to rotate said first ring.

17. The latch of claim 16, further comprising a second compression spring and a pin, wherein said base includes a longitudinal hole extending from said bore of said base at least partially through said projection of said base in a direction perpendicular to the perpendicular axis, said longitudinal hole including a distal end distal to said bore of said base, wherein said second compression spring and said pin are positioned within said longitudinal hole such that said second compression spring is adjacent said distal end of said longitudinal hole and said pin is adjacent said second compression spring opposite said distal end of said longitudinal hole, wherein said first ring includes an indentation formed within said outer surface of said first ring and positioned so as to be aligned with said longitudinal hole of said base when said first ring is positioned within said bore of said base.

18. The latch of claim 17, wherein said indentation includes a plurality of flat surfaces, and wherein said second compression spring urges said pin against a one of said flat surfaces that is aligned with said longitudinal hole so as to resist rotation of said first ring.

* * * * *